United States Patent
Ngai et al.

(10) Patent No.: US 10,314,041 B2
(45) Date of Patent: Jun. 4, 2019

(54) PREDICTIVE CONTROL FOR RADIO FREQUENCY COEXISTENCE MANAGEMENT IN MULTI-SIM-MULTI-ACTIVE (MSMA) DEVICES

(71) Applicant: QUALCOMM Incorporated, San Diego, CA (US)

(72) Inventors: Francis M. Ngai, Louisville, CO (US); Insung Kang, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/629,597

(22) Filed: Feb. 24, 2015

(65) Prior Publication Data

US 2015/0173082 A1 Jun. 18, 2015

Related U.S. Application Data

(62) Division of application No. 14/030,010, filed on Sep. 18, 2013, now Pat. No. 9,026,127.

(51) Int. Cl.

| | |
|---|---|
| *H04W 88/06* | (2009.01) |
| *H04W 72/04* | (2009.01) |
| *H04W 52/24* | (2009.01) |
| *H04W 72/12* | (2009.01) |
| *H04W 52/40* | (2009.01) |

(52) U.S. Cl.
CPC ..... *H04W 72/0473* (2013.01); *H04W 52/241* (2013.01); *H04W 52/243* (2013.01); *H04W 72/1215* (2013.01); *H04W 88/06* (2013.01); *H04W 52/40* (2013.01)

(58) Field of Classification Search
None
See application file for complete search history.

(56) References Cited

U.S. PATENT DOCUMENTS

| | | | |
|---|---|---|---|
| 6,337,987 B1 * | 1/2002 | Agin | H04W 52/04 370/318 |
| 8,244,297 B2 | 8/2012 | Zhu et al. | |
| 9,026,127 B2 | 5/2015 | Ngai et al. | |

(Continued)

FOREIGN PATENT DOCUMENTS

WO 2013150171 A1 10/2013

*Primary Examiner* — Huy D Vu
*Assistant Examiner* — Bao G Nguyen
(74) *Attorney, Agent, or Firm* — The Marbury Law Group, PLLC

(57) ABSTRACT

The various embodiments provide methods implemented in a MSMA communication device for managing a victim subscription's de-sense by proactively implementing an RF coexistence management strategy on the victim subscription when an RF coexistence event starts. In various embodiments, a MSMA communication device may implement an RF coexistence management strategy by determining when an aggressor subscription will de-sense a victim subscription and configuring the victim to anticipate and mitigate de-sense during the aggressor's transmissions. Thus, the various embodiments may provide dramatic improvements to the victim's overall reception performance and overall user experience.

28 Claims, 12 Drawing Sheets

(56) References Cited

U.S. PATENT DOCUMENTS

| | | | |
|---|---|---|---|
| 2002/0136233 A1* | 9/2002 | Chen | H04W 72/1215 370/445 |
| 2006/0183496 A1* | 8/2006 | Muraoka | H04W 52/08 455/522 |
| 2007/0054689 A1* | 3/2007 | Baker | H04L 1/0026 455/522 |
| 2007/0280183 A1* | 12/2007 | Cho | H04W 52/04 370/338 |
| 2009/0207746 A1* | 8/2009 | Yuan | H04B 17/345 370/252 |
| 2010/0304685 A1 | 12/2010 | Wietfeldt et al. | |
| 2011/0013612 A1 | 1/2011 | Thoukydides | |
| 2011/0312288 A1 | 12/2011 | Fu et al. | |
| 2012/0082140 A1 | 4/2012 | Lin et al. | |
| 2012/0135675 A1* | 5/2012 | Kim | H04L 27/0006 455/1 |
| 2012/0236736 A1 | 9/2012 | Frank et al. | |
| 2013/0012135 A1 | 1/2013 | Ruohonen et al. | |
| 2013/0028199 A1 | 1/2013 | Song et al. | |
| 2013/0337848 A1* | 12/2013 | Huertgen | H04W 24/00 455/456.6 |
| 2014/0133411 A1* | 5/2014 | Park | H04L 5/0058 370/329 |

\* cited by examiner

| Is the victim currently being de-sensed? | Is the victim predicted to be de-sensed during the next reception period? | Power-control remedial action to take just before the start of the victim's next reception period |
| --- | --- | --- |
| Yes | Yes | Implement a power-control remedial action based on an estimated difference between the victim's reception performance quality at the current reception period and the victim's reception performance quality at the next reception period |
| Yes | No | Implement a power-control remedial action based on an estimated difference between the victim's reception performance quality at the current reception period and the victim's reception performance quality at the next reception period |
| No | Yes | Implement a power-control remedial action based on an estimated difference between the victim's reception performance quality at the current reception period and the victim's reception performance quality at the next reception period |
| No | No | Continue normal receiver operations on the victim |

PREDICTIVE CONTROL FOR RADIO FREQUENCY COEXISTENCE MANAGEMENT IN MULTI-SIM-MULTI-ACTIVE (MSMA) DEVICES

RELATED APPLICATIONS

This application is a divisional of U.S. patent application Ser. No. 14/030,010, entitled "Predictive Control for Radio Frequency Coexistence Management in Multi-SIM-Multi-Active (MSMA) Devices" filed Sep. 18, 2013, the entire contents of which are hereby incorporated by reference.

BACKGROUND

Some new designs of mobile communication devices—such as smart phones, tablet computers, and laptop computers—contain two or more Subscriber Identity Module (SIM) cards that provide users with access to multiple separate mobile telephony networks. Examples of mobile telephony networks include GSM, TD-SCDMA, CDMA2000, and WCDMA. Example multi-SIM mobile communication devices include mobile phones, laptop computers, smart phones, and other mobile communication devices that are enabled to connect to multiple mobile telephony networks. A mobile communication device that includes a plurality of SIMs and connects to two or more separate mobile telephony networks using two or more separate RF transceivers is termed a "multi-SIM-multi-active" or "MSMA" device. An example MSMA device is a "dual-SIM-dual-active" or "DSDA" communication device, which includes two SIM cards/subscriptions associated with two mobile telephony networks.

Because a multi-SIM-multi-active communication device has a plurality of separate radio frequency ("RF") communication circuits or "RF chains," each subscription on the MSMA communication device may use its associated RF chain to communicate with its mobile network at any time. However, because of the proximity of the antennas of the RF chains included in a MSMA communication device, the simultaneous use of the RF chains may cause one or more RF chains to desensitize or interfere with the ability of the other RF chains to receive RF signals.

Generally, receiver desensitization (referred to as "de-sense"), or degradation of receiver sensitivity, may result from noise interference of a nearby transmitter. For example, when two radios are close together with one transmitting on the uplink—the aggressor communication activity ("aggressor")—and the other receiving on the downlink—the victim communication activity ("victim")—signals from the aggressor's transmitter may be picked up by the victim's receiver or otherwise interfere with reception of a weaker signal (e.g., from a distant base station). As a result, the received signals may become corrupted and difficult or impossible for the victim to decode. Receiver de-sense presents a design and operational challenge for multi-radio devices, such as MSMA communication devices, due to the necessary proximity of transmitter and receiver.

Current MSMA communication devices implement a number of techniques to enable a victim subscription suffering from de-sense or poor reception performance to improve its reception performance on the device. For example, a MSMA communication devices may utilize a downlink closed-loop power control system to improve reception performance for a victim by prompting the victim to request that its mobile network increase output power, which increases the signal strength (and signal-to-interference ratio (SIR)) of the incoming signal. In another example, a MSMA communication devices may utilize channel quality indicator (CQI) reporting—a measure of the quality of one or more of the victim's communication channels—to improve reception performance quality for a victim by prompting the victim to report a low CQI index value, typically indicating a bad channel quality/reception performance quality. After receiving the victim's CQI report, the mobile network may adjust its output power accordingly, thereby increasing the SIR of the incoming signal that the victim receives.

SUMMARY

The various embodiments provide methods implemented in a MSMA communication device for managing a victim subscription's de-sense by proactively implementing an RF coexistence management strategy on the victim subscription when an aggressor subscription begins de-sensing the victim subscription (i.e., when an RF coexistence event starts). In an embodiment, the MSMA communication device may implement an RF coexistence management strategy by determining when an aggressor subscription will de-sense a victim subscription and configuring the victim to anticipate and mitigate de-sense during the aggressor's transmissions. Thus, the various embodiments may provide dramatic improvements to the victim's overall reception performance and the overall user experience.

In an embodiment, after determining that a victim is being or is about to be de-sensed (i.e., that an RF coexistence event has started or will soon start), the MSMA communication device may determine the extent to which the aggressor's interference is affecting or is expected to affect the victim's performance. Based on these determinations, the MSMA communication device may determine a power-control remedial action to implement on the victim that will mitigate the effects of the aggressor's interference on the victim during the aggressor's transmissions.

In another embodiment, before implementing a determined power-control remedial action, the MSMA communication device may determine whether the determined power-control remedial action is viable. In other words, the MSMA communication device may determine whether the victim and/or the victim's network has the additional resources necessary to counteract the aggressor's interference or whether such countermeasures would even be sufficient to overcome the de-sense.

In a further embodiment, the MSMA communication device may implement a power-control remedial action when the power-control remedial action is determined to be viable. The MSMA communication device may configure the victim to request an increase in signal strength from its mobile network just before the aggressor's scheduled transmissions and to request that the victim's mobile network return its signal strength to normal levels just after the aggressor's scheduled transmissions.

In another embodiment, the MSMA communication device may implement Rx blanking on the victim when the power-control remedial action is not viable. In an embodiment, the MSMA communication device may implement Rx blanking by pausing the victim's reception operations just before the aggressor begins transmitting and resume those operations just after the aggressor stops transmitting. In a further embodiment, the MSMA communication device may cause the victim to notify its mobile network that it will be performing Rx blanking (i.e., will not be receiving) during the aggressor's transmissions. By informing the mobile network that it will not be receiving during the aggressor's transmissions, the victim may enable the network to conserve transmission resources.

In another embodiment, the MSMA communication device may implement a power-control remedial action based on the difference between the victim's current receiver power and the victim's predicted receiver power during the victim's next reception period. Thus, the MSMA communication device may ensure that future power-control remedial actions factor in the victim's current condition and anticipate changes to the victim's reception performance quality during the victim's next reception period.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 11B is a table illustrating embodiment actions to take during the victim's next reception period based on the predicted change in the victim's receiver power.

DETAILED DESCRIPTION

Figure 1:
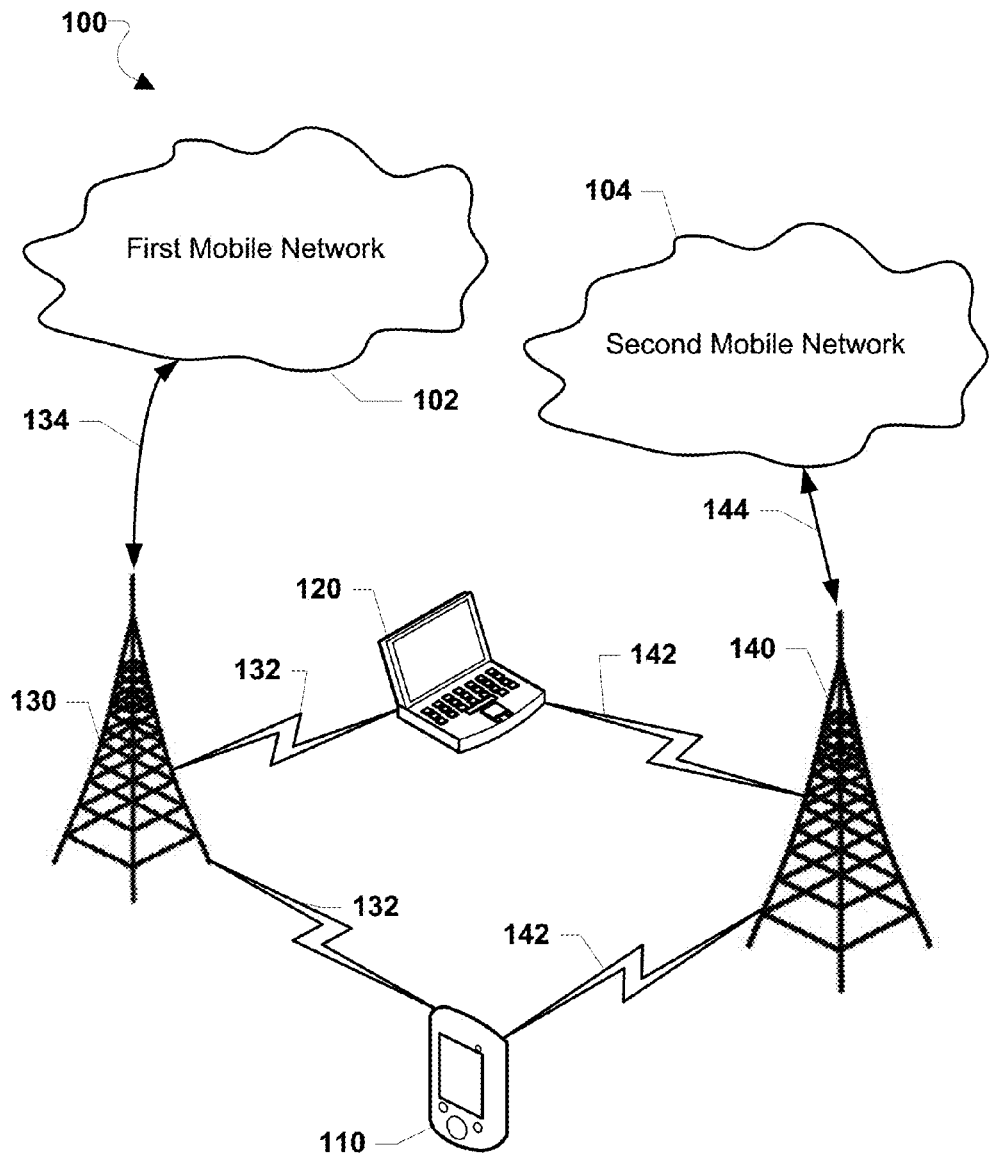
FIG. 1 is a communication system block diagram of mobile telephony networks suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "MSMA communication device" refers to any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices which include a programmable processor and memory and circuitry for connecting to at least two mobile communication networks. The various aspects may be useful in mobile communication devices, such as smart phones, and so such devices are referred to in the descriptions of the various embodiments. However, the embodiments may be useful in any electronic devices, such as a DSDA communication device, that may individually maintain a plurality of subscriptions to a plurality of mobile networks through a plurality of separate radio transceivers.

As described above, one or more subscriptions on a MSMA communication device may negatively affect the performance of other subscriptions operating on the MSMA communication device. For example, a DSDA communication device may suffer from interference when one subscription (i.e., the "aggressor") is attempting to transmit while the other subscription (i.e., the "victim") in the DSDA communication device is simultaneously attempting to receive transmissions (i.e., a "RF coexistence event"). During an RF coexistence event, an aggressor's transmissions may cause severe impairment to the victim's ability to receive transmissions. This interference may be in the form of blocking interference, harmonics, intermodulation, and other noises and distortion received by the victim. Such interference may significantly degrade the victim's receiver sensitivity, voice call quality and data throughput. These effects may also result in a reduced network capacity.

Currently, MSMA communication devices implement de-sense mitigation techniques only after an RF coexistence event has been detected (i.e., after the victim has already started being de-sensed). Considering that mitigation efforts take some time to take effect, typical de-sense mitigation strategies are inadequate to improve the victim's performance because, in many instances, the MSMA communication device's reactive remedial actions are completed too late and/or are too insubstantial to effectively mitigate the victim's de-sense. For example, by the time the MSMA communication device sends a power UP request to the victim's base station in response to detecting the victim's de-sense, the victim's use of the receiver may have ended (e.g., when the receiver is monitoring pages) or the aggressor may have stopped transmitting, causing the victim's mobile network to expend additional system resources needlessly.

In overview, the various embodiments provide methods implemented in a MSMA communication device (e.g., a DSDA communication device) for managing a victim subscription's de-sense by proactively implementing an RF coexistence management strategy on the victim subscription when an RF coexistence event starts. In various embodiments, a MSMA communication device may implement an RF coexistence management strategy by determining when an aggressor subscription will de-sense a victim subscription and configuring the victim to anticipate and mitigate de-sense during the aggressor's transmissions. Thus, the various embodiments may provide dramatic improvements to the victim's overall reception performance and the overall user experience.

In various embodiments, the aggressor may employ a time-division duplexing (TDD) radio technology (e.g., GSM) such that the aggressor's transmissions are predictably divided into several recurrent time slots of a fixed length. Also, in the various embodiments, the MSMA communication device may determine the aggressor's transmission schedule and proactively implement an RF coexistence management strategy to mitigate the effects of the aggressor's interference on the victim during the aggressor's scheduled transmissions.

In an embodiment, after determining that a victim is being or is about to be de-sensed (i.e., that an RF coexistence event has started or will soon start), the MSMA communication device may determine the extent to which the aggressor's interference is affecting or is expected to affect the victim's performance. The MSMA communication device may measure the interference power affecting or expected to affect the victim and calculate the effects of that interference on the victim, such as by estimating the difference between the victim's performance when it is being de-sensed and when it is not being de-sensed. For example, when the victim uses a closed-loop downlink power-control protocol, the MSMA communication device may determine the extent to which the aggressor's interference degrades the victim's received-signal-power-to-received-interference ratio (i.e., $E_b/N_t$) compared to a target or "ideal" $E_b/N_t$. In another example in which the victim performs CQI reporting, the MSMA communication device may measure the extent to which the aggressor's interference degrades the victim's CQI index as compared to a target or non-degraded CQI index.

In a further embodiment, based on these determinations, the MSMA communication device may determine a power-control remedial action to implement on the victim that will mitigate the effects of the aggressor's interference on the victim. In an embodiment, the MSMA communication device may determine the extent to which the victim's mobile network must increase its output power during the aggressor's transmissions to overcome the aggressor's interference. Thus, the power-control remedial actions taken by the victim may depend upon a measured amount of interference from the aggressor.

In an embodiment, the MSMA communication device may determine whether the determined power-control remedial action is viable. In other words, the MSMA communication device may determine whether the victim and/or the victim's network has the additional resources necessary to counteract the aggressor's interference or whether such countermeasures would even be sufficient to overcome the de-sense. For example, the MSMA communication device may decide not to implement a power-control remedial action when the additional output power required of the base station to overcome the interference is above a certain threshold (e.g., 10+ dB) that indicates an overwhelming amount of de-sense. The MSMA communication device may also not implement a power-control remedial action when the victim's downlink channel power is close to its ceiling or when the victim's network is close to being power-limited on the downlink.

In further embodiments, the MSMA communication device may implement a power-control remedial action when the power-control remedial action is viable. The MSMA communication device may configure the victim to request an increase in signal strength from its mobile network just before the aggressor's scheduled transmissions and to request that the victim's mobile network return its signal strength to normal levels just after the aggressor's scheduled transmissions. In an embodiment in which the victim utilizes a downlink closed-loop-downlink-power-control protocol, the victim may send to its mobile network a power UP request just prior to the aggressor's transmission and a power DOWN request just after the aggressor's transmission. Similarly, in another embodiment in which the victim performs CQI reporting, the victim may report a "degraded" CQI just before the aggressor's next transmission and may report a "non-degraded" CQI just after aggressor's schedule transmissions to return the mobile network's signal power to normal.

In another embodiment, the MSMA communication device may implement Rx blanking on the victim when the power-control remedial action is not viable. In an embodiment, the MSMA communication device may implement Rx blanking by freezing various power-control loops and filters of the victim and configuring the victim to zero/null samples received during the aggressor's scheduled transmissions. In other words, the MSMA communication device may pause the victim's reception operations just before the aggressor begins transmitting and resume those operations just after the aggressor stops transmitting. In a further embodiment, the MSMA communication device may cause the victim to notify its mobile network that it will be performing Rx blanking (i.e., will not be receiving) during the aggressor's transmissions. Thus, the victim may send a large power DOWN command or a "cease network transmitting" command to the victim's mobile network just prior to the aggressor's transmissions and may issue the opposite command just after the aggressor concludes transmitting. By informing the mobile network that it will not be receiving during the aggressor's transmissions, the victim may enable the network to conserve transmission resources.

The various embodiments may be implemented within a variety of communication systems 100, such as at least two mobile telephony networks, an example of which is illustrated in FIG. 1. A first mobile network 102 and a second mobile network 104 typically include a plurality of cellular base stations 130, 140. A first MSMA communication device 110 may be in communication with the first mobile network 102 through a cellular connection 132 to a first base station 130. The first MSMA communication device 110 may also be in communication with the second mobile network 104 through a cellular connection 142 to a second base station 140. The first base station 130 may be in communication with the first mobile network 102 over a connection 134. The second base station 140 may be in communication with the second mobile network 104 over a connection 144.

A second MSMA communication device 120 may similarly communicate with the first mobile network 102 through a cellular connection 132 to a first base station 130. The second MSMA communication device 120 may communicate with the second mobile network 104 through a cellular connection 142 to the second base station 140. Cellular connections 132 and 142 may be made through two-way wireless communication links, such as 4G, 3G, CDMA, TDMA, WCDMA, GSM, and other mobile telephony communication technologies.

While the MSMA communication devices 110, 120 are shown connected to two mobile networks 102, 104, in another embodiment (not shown), the MSMA communication devices 110, 120 may include two or more subscriptions to two or more mobile networks and may connect to those subscriptions in a manner similar to those described above.

Figure 2:
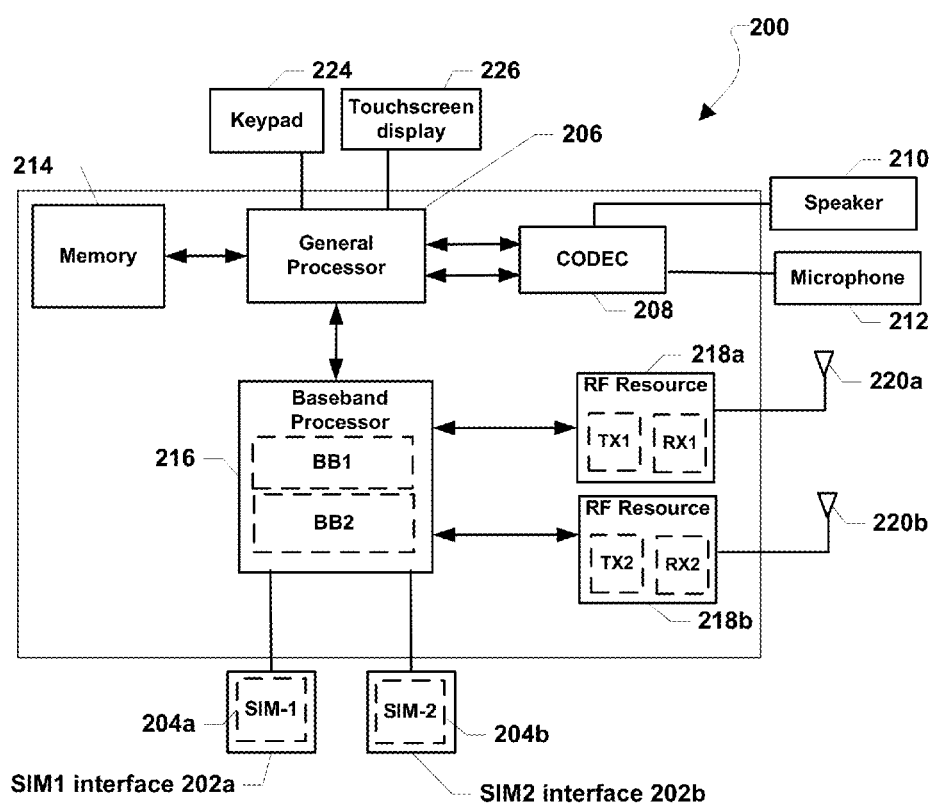
FIG. 2 is a component block diagram of an embodiment multi-SIM-multi-active communications device.

FIG. 2 is a functional block diagram of an embodiment MSMA communication device 200 suitable for implementing the various embodiments. The MSMA communication device 200 may include a first SIM interface 202a, which may receive a first identity module SIM-1 204a that is associated with the first subscription. The MSMA communication device 200 may also include a second SIM interface 202b, which may receive a second identity module SIM-2 204b that is associated with the second subscription.

A SIM in the various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM card may have a CPU, ROM, RAM, EEPROM and I/O circuits. A SIM used in the various embodiments may contain user account information, an international mobile subscriber identity (IMSI), a set of SIM application toolkit (SAT) commands and storage space for phone book contacts. A SIM card may further store a Home Public-Land-Mobile-Network (HPLMN) code to indicate the SIM card network operator provider. An Integrated Circuit Card Identity (ICCID) SIM serial number is printed on the SIM card for identification.

Each MSMA communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to at least one memory 214. Memory 214 may be a non-transitory computer readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure.

The general processor 206 and memory 214 may each be coupled to at least one baseband modem processor 216. Each SIM in the MSMA communication device 200 (e.g., SIM-1 202a and SIM-2 202b) may be associated with a baseband-RF resource chain. Each baseband-RF resource chain may include baseband modem processor 216 to perform baseband/modem functions for communications on a SIM, and one or more amplifiers and radios, referred to generally herein as RF resources. In one embodiment, baseband-RF resource chains may share a common baseband modem processor 216 (i.e., a single device that performs baseband/modem functions for all SIMs on the wireless device). Alternatively, each baseband-RF resource chain may include physically or logically separate baseband processors (e.g., BB1, BB2).

RF resources 218a, 218b may each be transceivers that perform transmit/receive functions for the associated SIM of the wireless device. RF resources 218a, 218b may include separate transmit and receive circuitry, or may include a transceiver that combines transmitter and receiver functions. The RF resources 218a, 218b may be coupled to a wireless antenna (e.g., a first wireless antenna 220a and a second wireless antenna 220b). The RF resources 218a, 218b may also be coupled to the baseband modem processor 216.

In an embodiment, the general processor 206, memory 214, baseband processor(s) 216, and RF resources 218a, 218b may be included in the MSMA communication device 200 as a system-on-chip. In another embodiment, the first and second SIMs 202a, 202b and their corresponding interfaces 204a, 204b may be external to the system-on-chip. Further, various input and output devices may be coupled to components on the system-on-chip, such as interfaces or controllers. Example user input components suitable for use in the MSMA communication device 200 may include, but are not limited to, a keypad 224 and a touchscreen display 226.

In an embodiment, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in a MSMA communication device 200 to enable communication between them, as is known in the art.

In another embodiment (not shown), the MSMA communication device 200 may include, among other things, additional SIM cards, SIM interfaces, a plurality of RF resources associated with the additional SIM cards, and additional antennae for connecting to additional mobile networks.

Figure 3:
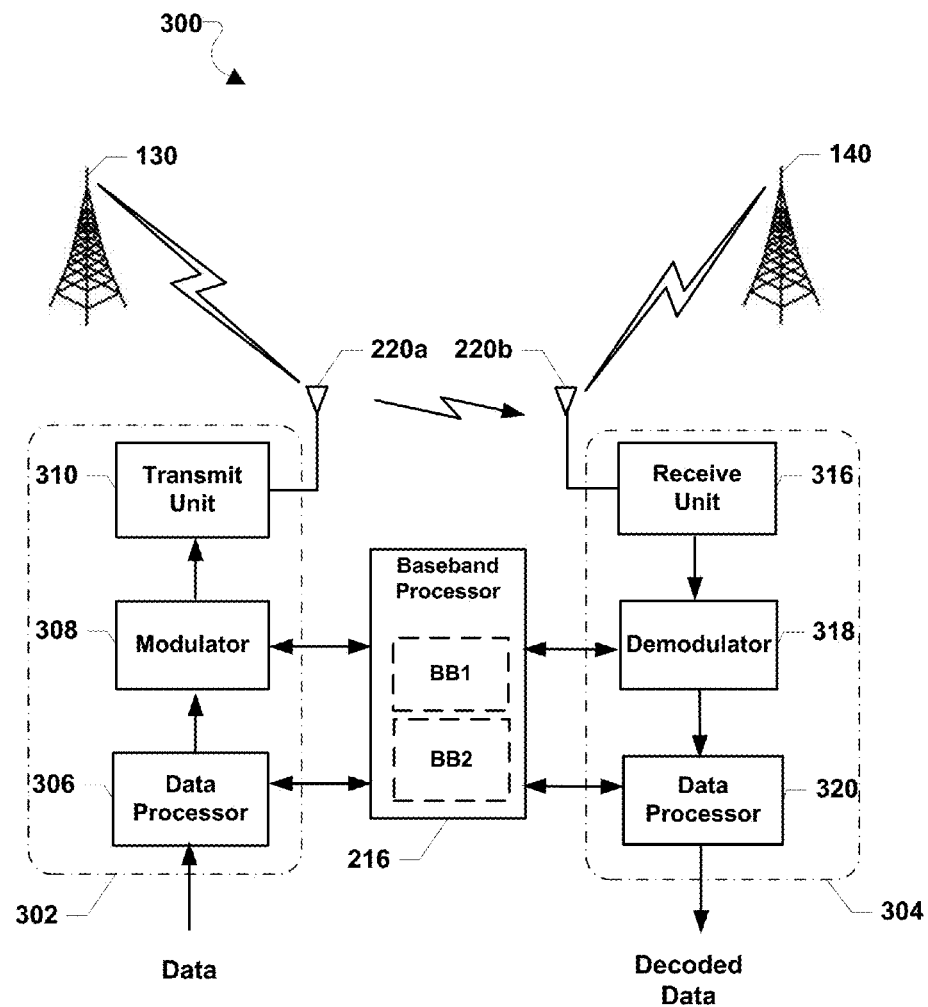
FIG. 3 is a component block diagram illustrating the interaction between components of different transmit/receive chains in an embodiment multi-SIM-multi-active communications device.

FIG. 3 illustrates a block diagram 300 of transmit and receive components in separate RF resources. For example, a transmitter 302 may be part of one RF resource 218a, and a receiver 304 may be part of another RF resource 218b, as described above with reference to FIG. 2. In a particular embodiment, the transmitter 302 may include a data processor 306 that may format, encode, and interleave data to be transmitted. The transmitter 302 may include a modulator 308 that modulates a carrier signal with encoded data, for example, by performing Gaussian minimum shift keying (GMSK). One or more transmit circuits 310 may condition the modulated signal (e.g., by filtering, amplifying, and upconverting) to generate an RF modulated signal for transmission. The RF modulated signal may be transmitted, for example, to a first base station 130 via an antenna, such as the first wireless antenna 220a as shown in FIG. 2.

At the receiver 304, a second wireless antenna 220b may receive RF modulated signals from a second base station 140 for example. However, the second wireless antenna 220b may also receive some RF signaling from the transmitter 302, which ultimately competes with the desired signal from the second base station 140. One or more receive circuits 316 may condition (e.g., filter, amplify, and downconvert) the received RF modulated signal, digitize the conditioned signal, and provide samples to a demodulator 318. The demodulator 318 may extract the original information-bearing signal from the modulated carrier wave, and may provide the demodulated signal to a data processor 320. The data processor 320 may de-interleave and decode the signal to obtain the original, decoded data, and may provide decoded data to other components in the wireless device. Operations of the transmitter and the receiver may be controlled by a processor, such as a baseband processor(s) 216 illustrated in FIG. 2. In the various embodiments, each of the transmitter 302 and receiver 304 may be implemented as circuitry that may be separated from their corresponding receive and transmit circuitries (not shown). Alternatively, the transmitter 302 and the receiver 304 may be respectively combined with corresponding receive circuitry and transmit circuitry (i.e., as transceivers associated with SIM-1 and SIM-2).

As discussed above, receiver de-sense may occur when data associated with a first SIM transmitted on the uplink interferes with receive activity on a different transmit/receive chain that may be associated with a second SIM. The desired signals may become corrupted and difficult or impossible to decode. Further, noise from the transmitter may be detected by a power monitor that measures the signal strength of surrounding cells, which may cause the MSMA communication device to falsely determine the presence of a nearby cell site.

By tailoring de-sense mitigating actions (i.e., an RF coexistence management strategy) to various properties of the transmitter and receiver in a proactive manner, the MSMA communication device may minimize or mitigate de-sense on the victim while minimizing possible degradation of service. For example, upon detecting or predicting that receiver de-sense is or may occur due to interference from transmit signals associated with an aggressor SIM in a MSMA communication device, the MSMA communication device may implement a power-control remedial action or Rx blanking on the victim SIM.

Figure 4:
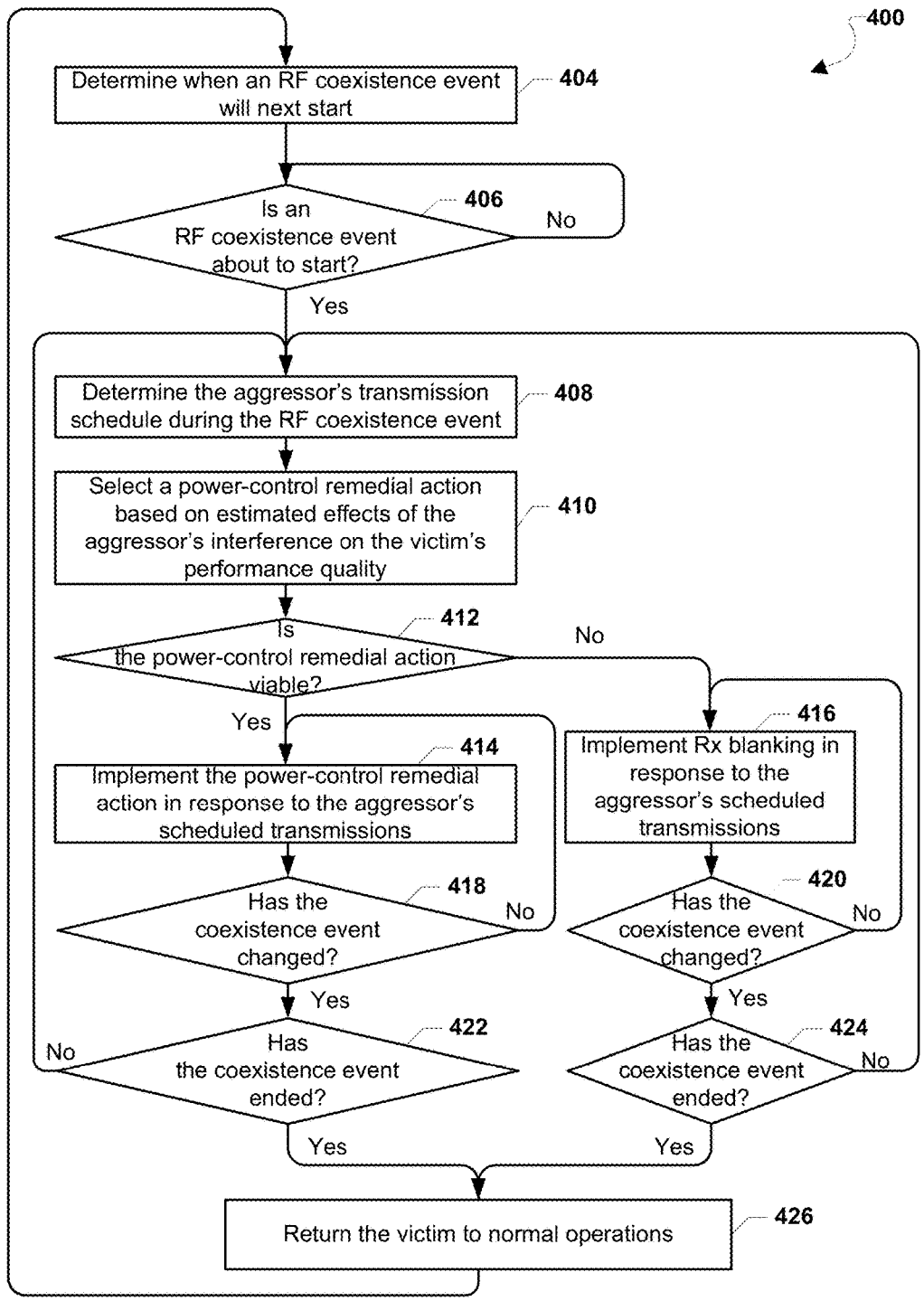
FIG. 4 is a process flow diagram illustrating an embodiment method for implementing an RF coexistence management strategy.

FIG. 4 illustrates an embodiment method 400 that may be implemented in a MSMA communication device for proactively implementing an RF coexistence management strategy. The MSMA communication device may begin performing method 400 by determining when an RF coexistence event will next start in block 404. In an embodiment, the MSMA communication device may preemptively determine when an RF coexistence event will start based on the MSMA communication device's understanding of the transmission and reception patterns of the two subscriptions. In other words, the MSMA communication device may predict when an aggressor will begin to de-sense a victim based on the subscriptions' previous activities or other timing information.

In determination block 406, the MSMA communication device may determine whether an RF coexistence event is about to start. In an embodiment, the MSMA communication device may determine whether an RF coexistence event is about to start based on the determination made in block 404 (e.g., based on the time the RF coexistence event was predicted to start). In other words, the MSMA communication device may preemptively determine that an RF coexistence event is about to start to ensure that the MSMA communication device has sufficient time to implement an RF coexistence management strategy before the RF coexistence event actually starts. In this manner the MSMA communication device enables the victim to implement a power-control remedial action or Rx blanking in time to be fully effective, rather than reacting after de-sense is detected.

If the MSMA communication device determines that an RF coexistence event is not about to start (i.e., determination block 406="No"), the MSMA communication device may continuously repeat the process in determination block 406 to recognize when an RF coexistence event is about to start. When the MSMA communication device determines that an RF coexistence event is about to start (i.e., determination block 406="Yes"), the MSMA communication device may determine the aggressor's transmission schedule during the RF coexistence event in block 408. In an embodiment, the MSMA communication device may implement various techniques and methods to determine the aggressor's transmission schedule. For example, the MSMA communication device may receive the aggressor's transmission schedule from its TDMA mobile network. In another example, because the aggressor accesses a TDMA mobile network and thus performs transmissions according to a predictable pattern, the MSMA communication device may determine the aggressor's future transmission schedule based on the aggressor's past transmission pattern.

In block 410, the MSMA communication device may select a power-control remedial action based on estimated effects of the aggressor's interference on the victim's performance quality. In other words, the MSMA communication device may determine an appropriate remedial action to improve the victim's performance during the aggressor's transmissions based on the predicted nature and amount of the victim's de-sense. In an embodiment, the MSMA communication device may estimate the effects of the aggressor's interference using different metrics, such as the difference between the Eb/Nt of the victim during the aggressor's transmissions and the Eb/Nt of the victim when the aggressor is not transmitting or a target/ideal Eb/Nt. Similarly, in another embodiment, the MSMA communication device may calculate the difference in the CQI index during the aggressor's transmissions and when the aggressor is not transmitting. Based on the estimated effects of the aggressor's interference, the MSMA communication device may determine an appropriate remedial action to mitigate the victim's de-sense. For example, the MSMA communication device may determine that the victim's mobile network must increase output by 5 dB during the aggressor's transmissions to maintain a minimally acceptable performance quality (i.e., a threshold Eb/Nt or CQI index) for the victim. Determining a power-control remedial action based the estimated effects of the aggressor's interference is discussed below with reference to FIG. 5.

After determining the power-control remedial action needed to overcome the aggressor's interference, the MSMA communication device may determine whether that power-control remedial action is viable in determination block 412. In an embodiment, the victim's mobile network may only have finite resources with which to enhance the victim's performance during the aggressor's transmissions. In other words, the victim's power-control remedial action may only be viable when the victim's network has sufficient downlink channel power available to overcome the aggressor's interference. Therefore, the MSMA communication device may check various aspects of the victim's mobile network to determine whether the power-control remedial action is viable as discussed below with reference to FIG. 6.

If the MSMA communication device determines that the power-control remedial action is viable (i.e., determination block 412="Yes"), the MSMA communication device may implement the power-control remedial action in response to the aggressor's scheduled transmissions in block 414. In an embodiment, the proactive power-control remedial actions may cause the victim to request an increase in network power just before the aggressor's transmissions and to request a decrease in network power just after the aggressor has finished its transmissions. Implementing a power-control remedial action is further discussed below in relation to FIG. 7A-7B.

In an embodiment, the MSMA communication device may continue to implement the same power-control remedial action as long as the RF coexistence event situation remains unchanged. Thus, the MSMA communication device may determine in determination block 418 whether the RF coexistence event has changed. For example, the aggressor's transmission schedule may have changed, the amount of interference may have increased/decreased, or the victim's Rx signal strength may have increase/decreased because the victim reselected to another cell. If the MSMA communication device determines that the RF coexistence event has not changed (i.e., determination block 418="No"), the MSMA communication device may continue implementing the power-control remedial action in response to the aggressor's scheduled transmissions in block 414.

Otherwise, if the MSMA communication device determines that the RF coexistence event has changed (i.e., determination block 418="Yes"), the MSMA communication device may also determine whether the RF coexistence event has ended in determination block 422. For example, the aggressor may have stopped transmitting and may have started performing idling operations. If the MSMA communication device determines that the coexistence event has not ended (i.e., determination block 422="No"), the MSMA communication device may determine a new power-control remedial action by repeating the operations beginning with block 408. Otherwise, if the MSMA communication device determines that the RF coexistence event has ended (i.e., determination block 422="Yes"), the MSMA communication device may return the victim to normal operations in block 426. In an embodiment, the MSMA communication device may cease implementing the power-control remedial action on the victim. This process may continue in a loop as the MSMA communication device may continue determining when an RF coexistence event will next occur in block 404.

When the MSMA communication device determines that the power-control remedial action is not viable (i.e., determination block 412="No"), the MSMA communication device may implement Rx blanking in response to the aggressor's scheduled transmissions. In an embodiment, Rx blanking may effectively pause the victim's reception activities just before the aggressor begins transmitting and resume or re-enable the victim's reception activities just after the aggressor stops transmitting. Implementing Rx blanking on the victim is further described below with reference to FIGS. 8A-8B.

Rx blanking may continue so long as the de-sense situation exists. Thus, in determination block 420, the MSMA communication device may determine whether the coexistence event has changed as described above with reference to determination block 418. If the MSMA communication device determines that the RF coexistence situation has changed (i.e., determination block 420="No"), the MSMA communication device may continue implementing Rx blanking in response to the aggressor's scheduled transmissions. Otherwise, if there is a change in the coexistence event (i.e., determination block 420="Yes"), the MSMA communication device may determine whether the coexistence situation has ended in determination block 424 as discussed above with reference to determination block 422. If the MSMA communication device determines that the coexistence situation has not ended (i.e., determination block 424="No"), the MSMA communication device may determine a new power-control remedial action by repeating the operations beginning with block 408.

If the MSMA communication device determines that the coexistence situation has ended (i.e., determination block 424="Yes"), the MSMA communication device may return the victim to normal operations in block 426. For example, the MSMA communication device may cease implementing Rx blanking on the victim if that was the implemented mediation response.

These operations may be implemented in a continuous loop, and the MSMA communication device may continue determining when an RF coexistence event will next occur in block 404.

In further embodiments (not shown), the MSMA communication device may include one or more aggressors and one or more victims. In an embodiment, when there are one or more aggressors and one or more victims, the MSMA communication may determine in block 404 that an RF coexistence event will next start when at least one aggressor is scheduled to transmit while at least one victim is scheduled to receive. Similarly, in block 408, the MSMA communication device may determine the combined transmission schedule for the one or more aggressors' transmission during the RF coexistence event. In other words, the combined transmission schedule may identify times during which at least one aggressor is transmitting.

In another embodiment in which there are one or more aggressors and/or victims on the MSMA communication device, in block 410, the MSMA communication device may determine a power-control remedial action for each of one or more victims based on the combined estimated effects of the one or more aggressors' interference. In other words, the MSMA communication device may analyze the circumstances for each victim individually based on one or a plurality of aggressors' combined interference. For example, the MSMA communication device may sum the one or more aggressors' interference when determining how the one or more victims will be affected. In a further embodiment, in determination block 412, the MSMA communication device may determine whether the power-control remedial action is viable for each of the one or more victims. For instance, the MSMA communication may determine that the power-control remedial action is viable for a first victim because the first victim's network has excess resources, but the MSMA communication device may determine that the power control remedial action is not viable for another victim for various reasons. As such, in a further embodiment, the MSMA communication device may implement the power-control remedial action in block 414 or implement Rx blanking in block 416 for each of one or more victims affected by interference by the one or more aggressors.

Figure 5:
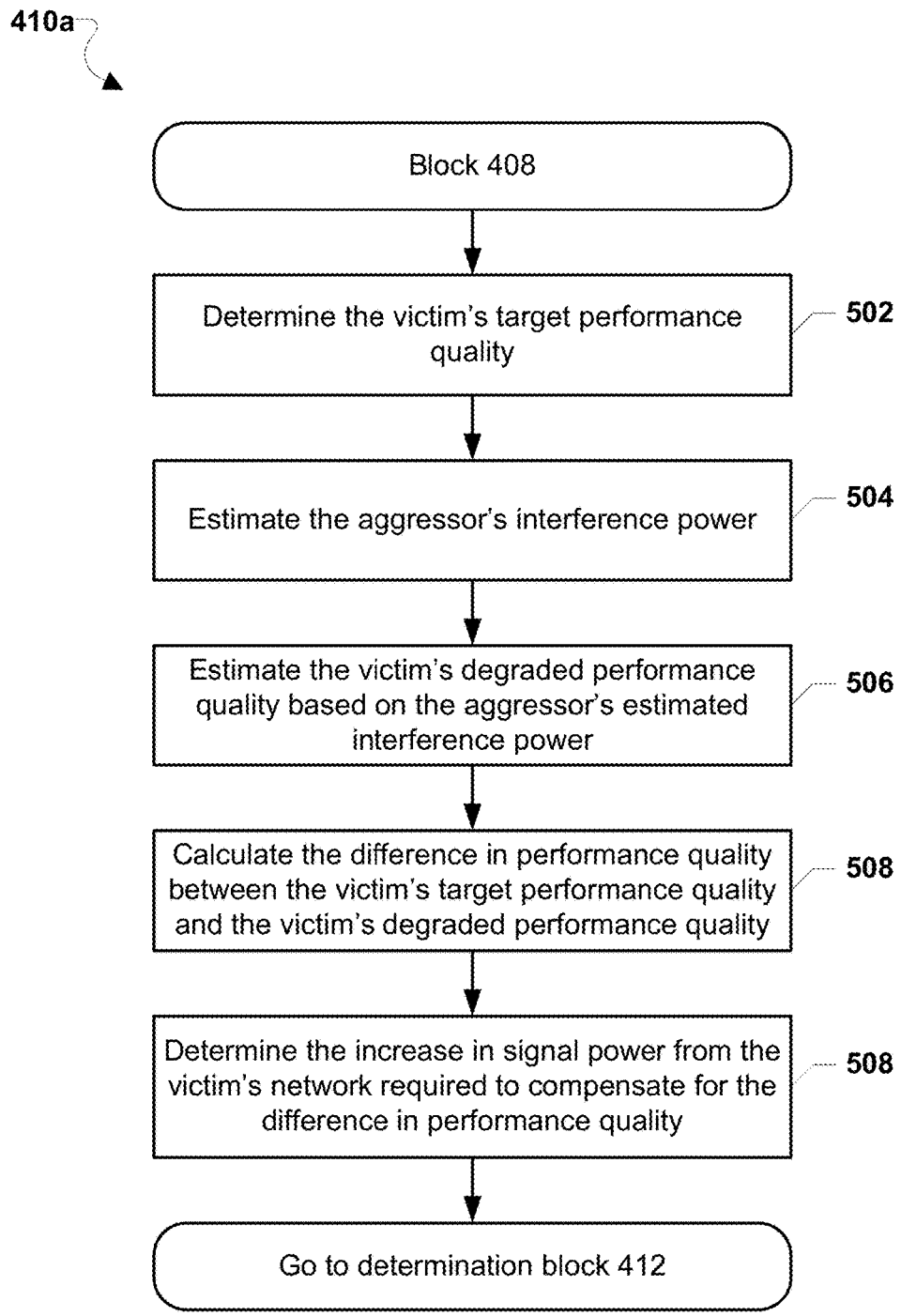
FIG. 5 is a process flow diagram illustrating an embodiment method for determining a power-control remedial action based on estimated effects of an aggressor's interference.

FIG. 5 illustrates an embodiment method 410*a* that may be implemented on a MSMA communication device for determining a power-control remedial action based on estimated effects of the aggressor's interference on the victim's performance quality. The operations of method 410*a* implement an embodiment of the operations block 410 of method 400 described above with reference to FIG. 4.

In block 502, the MSMA communication device may determine the victim's target performance quality. The victim's target performance quality may be the victim's acceptable or ideal operating condition. In an embodiment, if the victim performs closed-loop power control, the victim's target performance quality may be a particular reception signal strength (i.e., an Eb/Nt value) that may cause the victim to receive communications from its mobile network at a minimally acceptable level. In another embodiment, if the victim performs CQI reporting, the target performance equality may be a minimum channel quality value the victim must maintain to continue performing at an acceptable level.

In block 504, the MSMA communication device may estimate the aggressor's interference power. In an embodiment, the MSMA communication device may estimate the aggressor's interference power based on the aggressor's current transmitter power, the aggressor's previous transmitter power, or previous measurements of the victim's de-sense caused by the aggressor.

The MSMA communication device may also estimate the victim's degraded performance quality based on the aggressor's estimated interference power in block 506. In an embodiment, the MSMA communication device may calculate the effects of the aggressor's interference power (e.g., as determined in the operations in block 504) on the victim's target performance quality.

In block 508, the MSMA communication device may calculate the difference in performance between the victim's target performance quality and the victim's degraded performance quality. The MSMA communication device may also determine the increase in signal power from the victim's network that is required to compensate for the difference in performance quality in block 508. For example, the MSMA communication device may calculate that, as a result of the aggressor's interference, the victim's degraded performance quality is 5 dB below the victim's target performance quality. Thus, in this example, the MSMA communication device may determine that the victim's network will need to increase the signal power of communications transmitted to the victim by 5 dB to compensate for the victim's degraded performance. The MSMA communication device may continue by determining whether the power-control remedial action is viable as discussed above regarding determination block 412 of method 400 with reference to FIG. 4.

In further embodiments, the MSMA communication device may perform the operations of method 410a for each of one or more victims. In such embodiments, the MSMA communication device may estimate the effects of one or more aggressors' combined interference power on the performance of each of the one or more victims and determine the increase in signal power needed from each victim's network.

Figure 6:
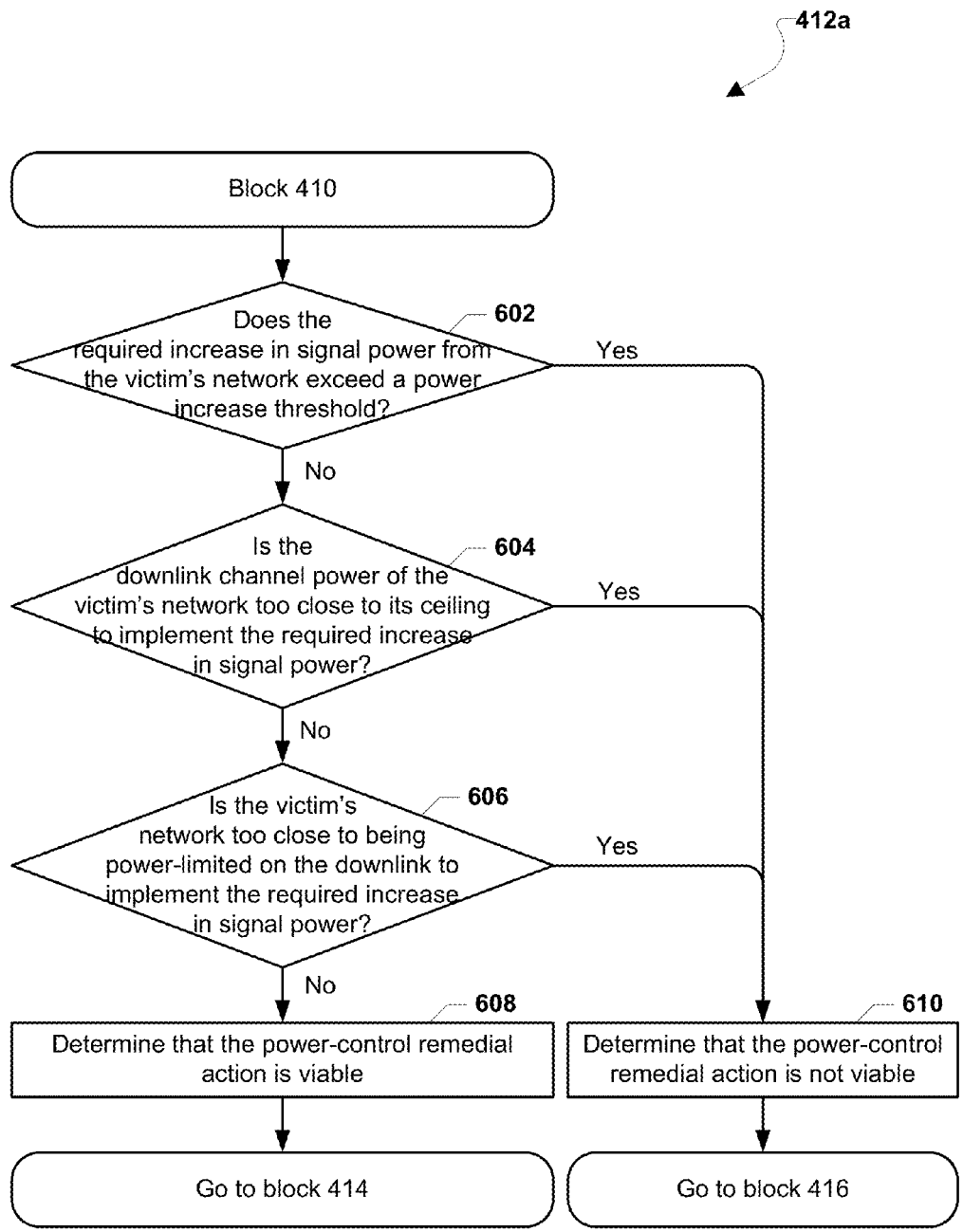
FIG. 6 is a process flow diagram illustrating an embodiment method for determining whether a power-control remedial action is viable.

FIG. 6 illustrates an embodiment method 412a that may be implemented in a MSMA communication device for determining whether a power-control remedial action is viable. The operations of method 412a implement an embodiment of the operations in determination block 412 of method 400 described above with reference to FIG. 4. The MSMA communication device may begin performing method 412a after determining a power-control remedial action as described above with reference to block 410 of method 400 illustrated in FIG. 4.

In determination block 602, the MSMA communication device may determine whether a required increase in the signal power from the victim's network exceeds a power increase threshold. As described above with reference to block 508 of method 410a illustrated in FIG. 5, the MSMA communication device may determine the required increase in signal power (i.e., how much the victim's network must increase its signal power) that will overcome the anticipated victim de-sense. In an embodiment, the power increase threshold may be the maximum amount the victim's network may increase its signal power to the victim. The power increase threshold may also indicate the maximum amount the victim's network is capable of increase its signal power. In another embodiment, the power increase threshold may indicate other limitations, such as the maximum amount the victim's network can increase the victim's signal power before adversely affecting other subscriptions on the network. If the MSMA communication device determines that the required increase in signal power from the victim's network exceeds a power increase threshold (i.e., determination block 602="Yes"), the MSMA communication device may determine that the power-control remedial action is not viable in block 610. The MSMA communication device may continue by implementing Rx blanking in response to the aggressor's scheduled transmissions as described above in regards to block 416 with reference to FIG. 4.

If the MSMA communication device determines that the required increase in the signal power from the victim's network does not exceed the power increase threshold (i.e., determination block 602="No"), the MSMA communication device may determine whether the downlink channel power of the victim's network is too close to its ceiling for the victim's network to implement the required increase in signal power in determination block 604. If the MSMA communication device determines that the victim's network's downlink channel power is too close to its ceiling to implement the required increase in signal power (i.e., determination block 604="Yes"), the MSMA communication device may determine in block 610 that the power-control remedial action is not viable. In that event, the MSMA communication device may implement Rx blanking in response to the aggressor's scheduled transmissions in block 416 as described above with reference to FIG. 4.

If the MSMA communication device determines that the downlink channel power of the victim's network is not too close to its ceiling to implement the required increase in signal power (i.e., determination block 604="No"), the MSMA communication device may determine whether the victim's network is too close to being power-limited on the downlink to implement the required increase in signal power in determination block 606. In an embodiment, the victim's network may be incapable of increasing the signal power enough to mitigate the effects of the aggressor's interference. If the MSMA communication device determines that the victim's network is too close to being power-limited on the downlink to implement the required increase in signal power (i.e., determination block 606="Yes"), the MSMA communication device may determine that the power-control remedial action is not viable in block 610. In that event the MSMA communication device may implement Rx blanking in response to the aggressor's scheduled transmissions in block 416 as described above with reference to FIG. 4.

If the MSMA communication device determines that the victim's network is not too close to being power-limited on the downlink to implement the required increase in signal power (i.e., determination block 606="No"), the MSMA communication device may determine that the power-control remedial action is viable in block 608. In that event the MSMA communication device may implement the power-control remedial action in response to the aggressor's scheduled transmission in block 414 as described above with reference to FIG. 4.

In further embodiments, the MSMA communication device may separately perform the operations of method 412a for each of one or more victims operating on the MSMA communication device.

Figure 7A:
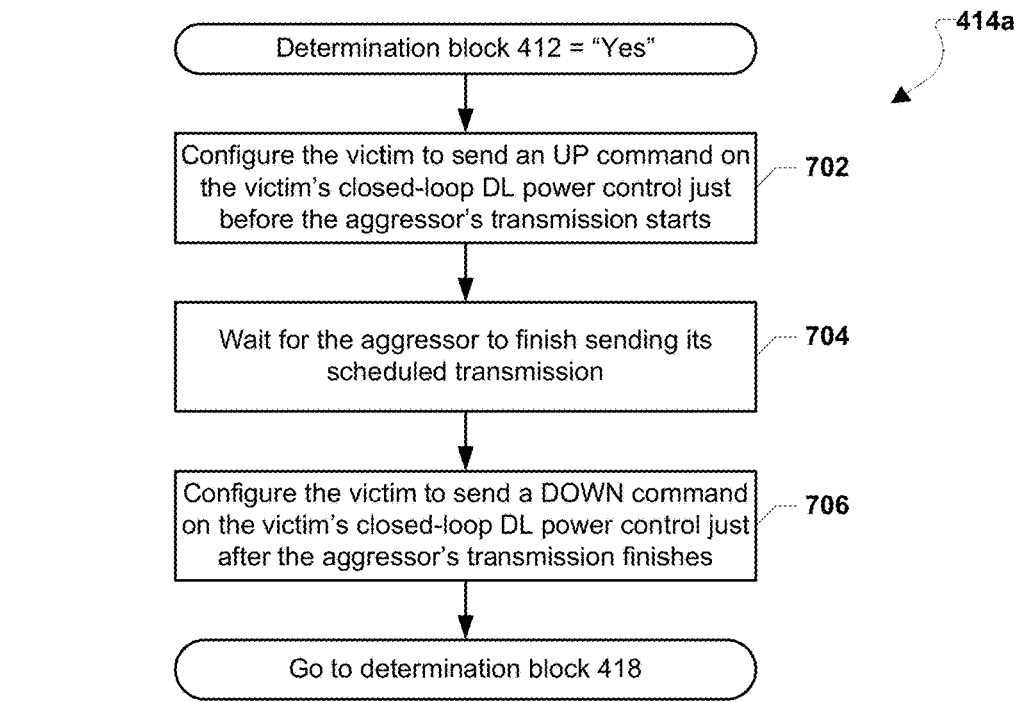
FIGS. 7A-7B are process flow diagrams illustrating embodiment methods for implementing a power-control remedial action.
Figure 7B:
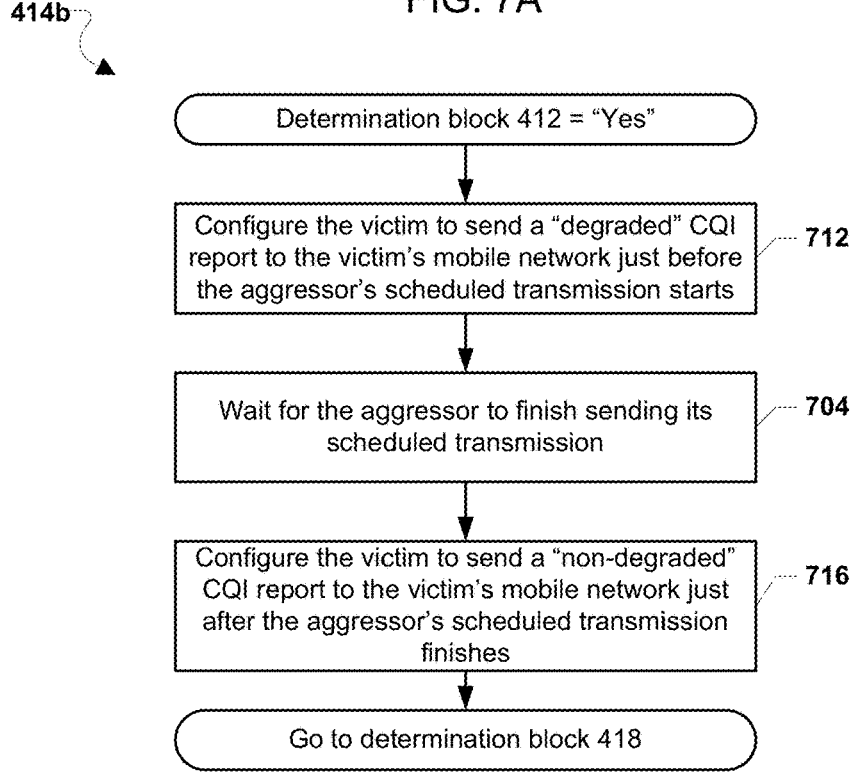

FIGS. 7A and 7B illustrate embodiment methods 414a, 414b that may be implemented in a MSMA communication device for implementing a power-control remedial action on the victim in response to the aggressor's scheduled transmissions. The operations of methods 414a, 414b implement embodiments of operations in block 414 of method 400 described above with reference to FIG. 4. In various embodiments, the MSMA communication device may implement a power-control remedial action by configuring the victim to perform one or more actions just before the aggressor's transmissions in order to boost the victim's Rx signal strength (e.g., SIR) during the aggressor's transmissions. The MSMA communication device may also configure the victim to perform normally after the aggressor completes its transmissions.

FIG. 7A illustrates an embodiment method 414a for implementing a power-control remedial action when the victim utilizes closed-loop downlink power controls. The MSMA communication device may perform the operations of method 414a when the MSMA communication device determines that the power-control remedial action is viable (i.e., determination block 412="Yes").

In block 702, the MSMA communication device may configure the victim to send an UP command on the victim's close-loop downlink power control to its mobile network just before the aggressor's scheduled transmission starts. The UP command may cause the victim's mobile network (i.e., the victim's base station) to increase the mobile network's signal power to compensate for the aggressor's interference. For example, if the MSMA communication device determines that the required increase in signal power from the victim's network is 5 dB, the MSMA communication device may configure the victim to send an UP command to the victim's mobile network to increase its output power by 5 dB.

In an embodiment, the MSMA communication device may configure the victim to send multiple, fixed-size power UP commands. In the example described above, the MSMA communication device may configure the victim to send ten 0.5 dB power UP commands such that the cumulative effect of these power UP commands causes the victim's mobile network to increase its signal power by 5 dB just before the aggressor's transmissions.

In another embodiment, the MSMA communication device may configure the victim to send a variable power UP command that avoids the need for multiple, fixed-step power UP commands. In such an embodiment, the power UP command may request an increase in output power of an arbitrary size rather than a fixed size. In the example described above, the MSMA communication device may configure the victim to send one 5 dB power UP command rather than ten 0.5 dB commands. Thus, by enabling the victim to send just one, variable power UP/DOWN command instead of multiple fixed-size commands, the MSMA communication device may more effectively prepare the victim to handle the aggressor's interference.

Returning to FIG. 7A, the MSMA communication device may wait for the aggressor to finish sending its scheduled transmission in block 704. In other words, the MSMA communication device may wait until the aggressor has stopped transmitting and/or until victim de-sense is no longer occurring.

In block 706, the MSMA communication device may configure the victim to send a DOWN command on the victim's closed-loop downlink power control to the victim's mobile network just after the aggressor's scheduled transmission finishes. In an embodiment, the power DOWN commands may return the signal power of the victim's mobile network to normal level when the aggressor is not transmitting. For example, if the victim sent a power UP command of 5 dB just before the aggressor's transmission, the victim may send a power DOWN command of 5 dB just after the aggressor's transmission.

The MSMA communication device may determine whether the coexistence event has changed in determination block 418 of method 400 as described above with reference to FIG. 4.

FIG. 7B illustrates an embodiment method 414b for implementing a power-control remedial action when the victim utilizes CQI reporting. The MSMA communication device may begin performing the operations of method 414a when the MSMA communication device determines that the power-control remedial action is viable (i.e., determination block 412="Yes").

In block 712, the MSMA communication device may configure the victim to send a degraded CQI report to the victim's mobile network just before the aggressor's scheduled transmission starts. In an embodiment, the "degraded" CQI report may be an estimate of the victim's CQI index during the aggressor's transmissions. For example, if the MSMA communication device previously determined that the required signal power increase is 3 dB, the MSMA communication device may configure the victim to fabricate a CQI report that causes the victim's mobile network to increase its signal power by 3 dB just before the aggressor's scheduled transmission time.

In block 704, the MSMA communication device may wait for the aggressor to finish sending its scheduled transmission and/or until victim de-sense is no longer occurring as described above with reference to FIG. 7A.

In block 716, the MSMA communication device may configure the victim to send a non-degraded CQI report to the victim's mobile network just before the aggressor's scheduled transmission finishes. In an embodiment, the "non-degraded" CQI report may cause the victim's mobile network to return its signal power to a normal level. In other words, the victim's mobile network may reduce its signal power to normal levels when the aggressor is not transmitting because the extra signal power is not necessary.

The MSMA communication device may determine whether the coexistence event has changed in determination block 418 of method 400 as described above with reference to FIG. 4.

In further embodiments, the MSMA communication device may separately perform the operations of methods 414a, 414b for each of one or more victims operating on the MSMA communication device for which implementing the power-control remedial action is determined to be viable.

Figure 8A:
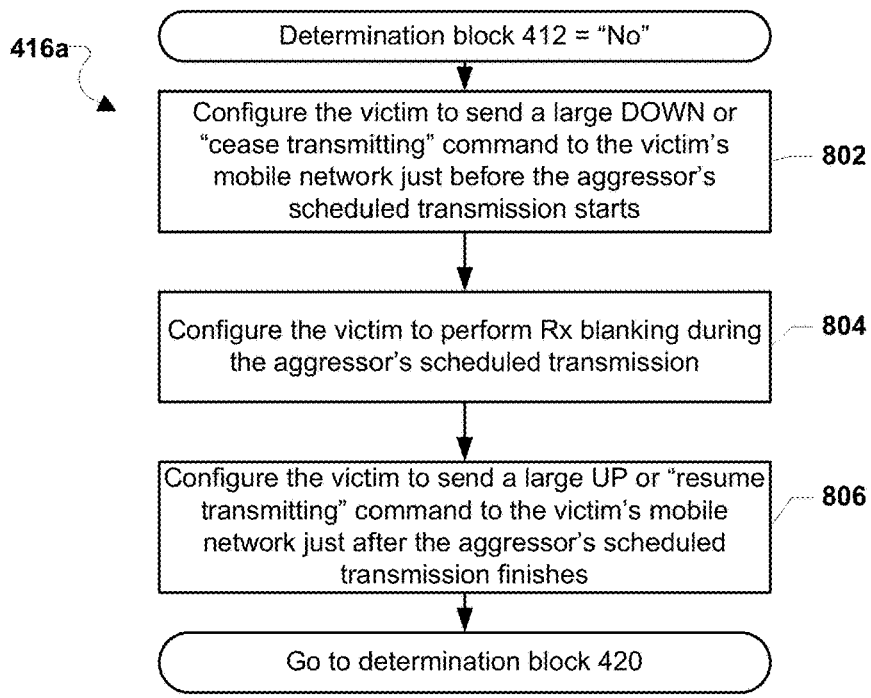
FIGS. 8A-8B are process flow diagrams illustrating embodiment methods for implementing Rx blanking on the victim.
Figure 8B:
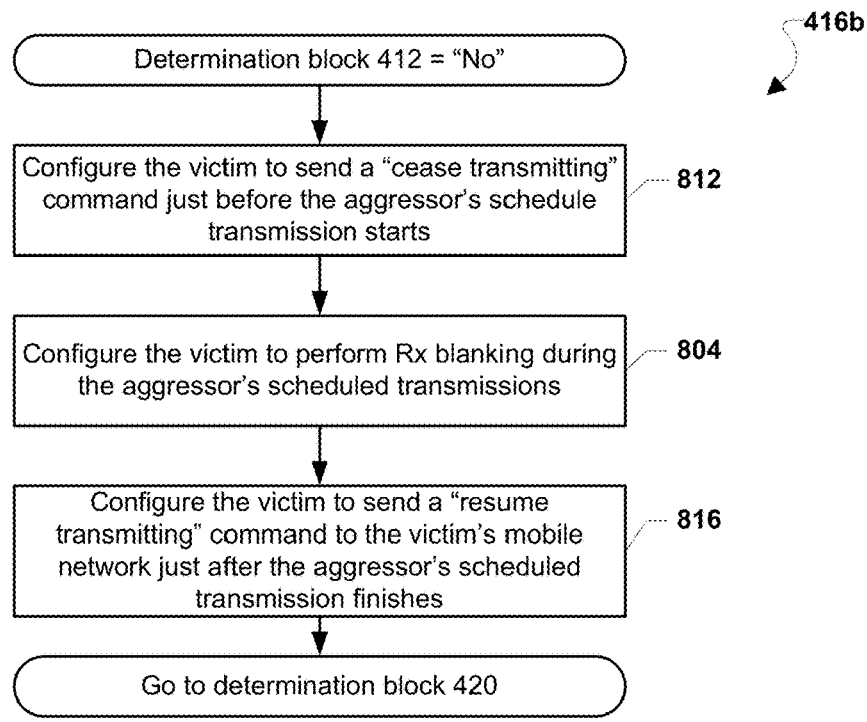

FIGS. 8A and 8B illustrate embodiment methods 416a, 416b that may be implemented in a MSMA communication device for implementing Rx blanking on the victim during the aggressor's scheduled transmissions. The operations of methods 416a, 416b implement embodiments of operations in block 416 of method 400 described above with reference to FIG. 4. In various embodiments, the MSMA communication device may implement Rx blanking on the victim by configuring the victim to indicate to the victim's mobile network just before the aggressor's scheduled transmissions that the victim will be performing Rx blanking during the aggressor's transmissions, thereby saving the mobile network's resources. The victim may perform Rx blanking by, among other things, nulling or ignoring samples received during the aggressor's scheduled transmissions. Rx blanking is described in further detail below with reference to FIGS. 9 and 10. The MSMA communication device may also configure the victim to perform normally after the aggressor completes its transmissions.

FIG. 8A illustrates an embodiment method 416a for implementing Rx blanking on a victim that utilizes closed-loop downlink power control. In block 802, the MSMA communication device may configure the victim to send a large DOWN or "cease transmitting" command to the victim's mobile network just before the aggressor's scheduled transmission starts. In an embodiment, when the MSMA communication device determines that a power control remedial action is not viable, the MSMA communication device may attempt to alert the victim's mobile network that the victim will be performing Rx blanking (i.e., not receiving signals) during the aggressor's scheduled transmissions.

In block 804, the MSMA communication device may configure the victim to perform Rx blanking during the aggressor's scheduled transmissions. In an embodiment, the victim may ignore any signals received during the aggressor's transmission period.

In block 806, the MSMA communication device may configure the victim to send a large power UP command or a "resume transmitting" command to the victim's mobile network just after the aggressor's scheduled transmission finishes. In an embodiment, the MSMA communication device may cause the victim to instruct the victim's mobile network to resume normal operations (e.g., normal signal power, etc.) when the aggressor is not transmitting. The MSMA communication device may determine whether the coexistence event has changed in determination block 420 of method 400 as described above with reference to FIG. 4.

FIG. 8B illustrates an embodiment method 416b for implementing Rx blanking on a victim that utilizes CQI reporting. In block 812, the MSMA communication device may configure the victim to send a "cease transmitting" command just before the aggressor's scheduled transmission starts. As discussed above, the MSMA communication device may enable the victim's network to conserve system resources by causing the victim to instruct the mobile network to cease network transmissions during the aggressor's scheduled transmissions. The MSMA communication device may also configure the victim to perform Rx blanking during the aggressor's scheduled transmission in block 804 of method 416a as described above with reference to FIG. 8A.

In block 816, the MSMA communication device may configure the victim to send a "resume transmitting" command to the victim's mobile network just after the aggressor's scheduled transmission finishes. In an embodiment, the MSMA communication device may cause the victim's mobile network to resume the victim's normal reception activities when the aggressor is not de-sensing the victim (i.e., when the victim is not performing Rx blanking) The MSMA communication device may determine whether the coexistence event has changed in determination block 420 of method 400 as discussed above with reference to FIG. 4.

In further embodiments, the MSMA communication device may separately perform the operations of methods 416a, 416b for each of one or more victims operating on the MSMA communication device for which implementing the power-control remedial action is determined not to be viable.

Figure 9:
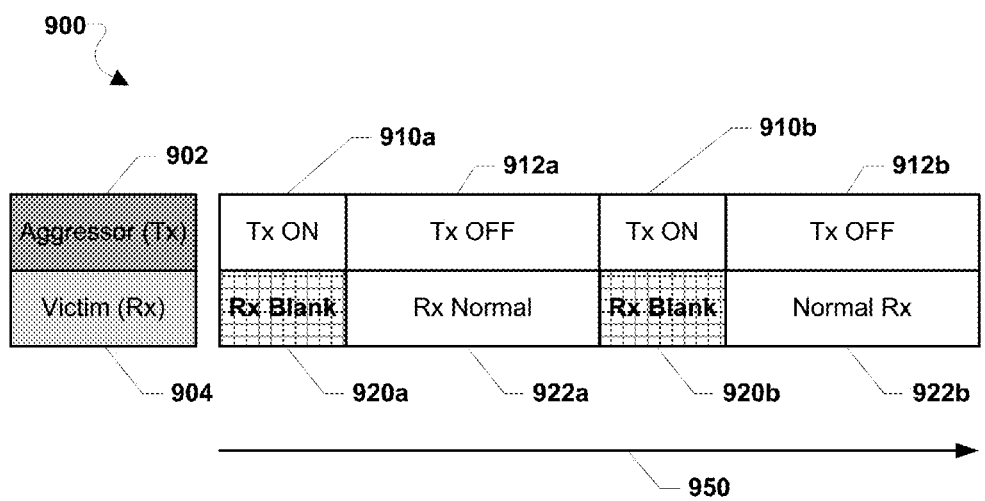
FIG. 9 is a timeline diagram illustrating an RF coexistence event.

FIG. 9 is a timeline diagram 900 illustrating a sequence of operations in which a victim performs Rx blanking during an RF coexistence event 950. As discussed above, when a MSMA communication device determines that power-control remedial action is not viable, the MSMA communication device may configure the victim 904 to perform Rx blanking during the transmissions of the aggressor 902. As illustrated in FIG. 9, when the aggressor 902 is transmitting (e.g., transmission periods 910a and 910b), the victim 904 may be configured to implement corresponding periods of Rx blanking 920a and 920b, when the aggressor 902 is not transmitting (e.g., non-transmission periods 912a and 912b), the victim 904 may revert to normal receiving operations 922a and 922b.

Figure 10:
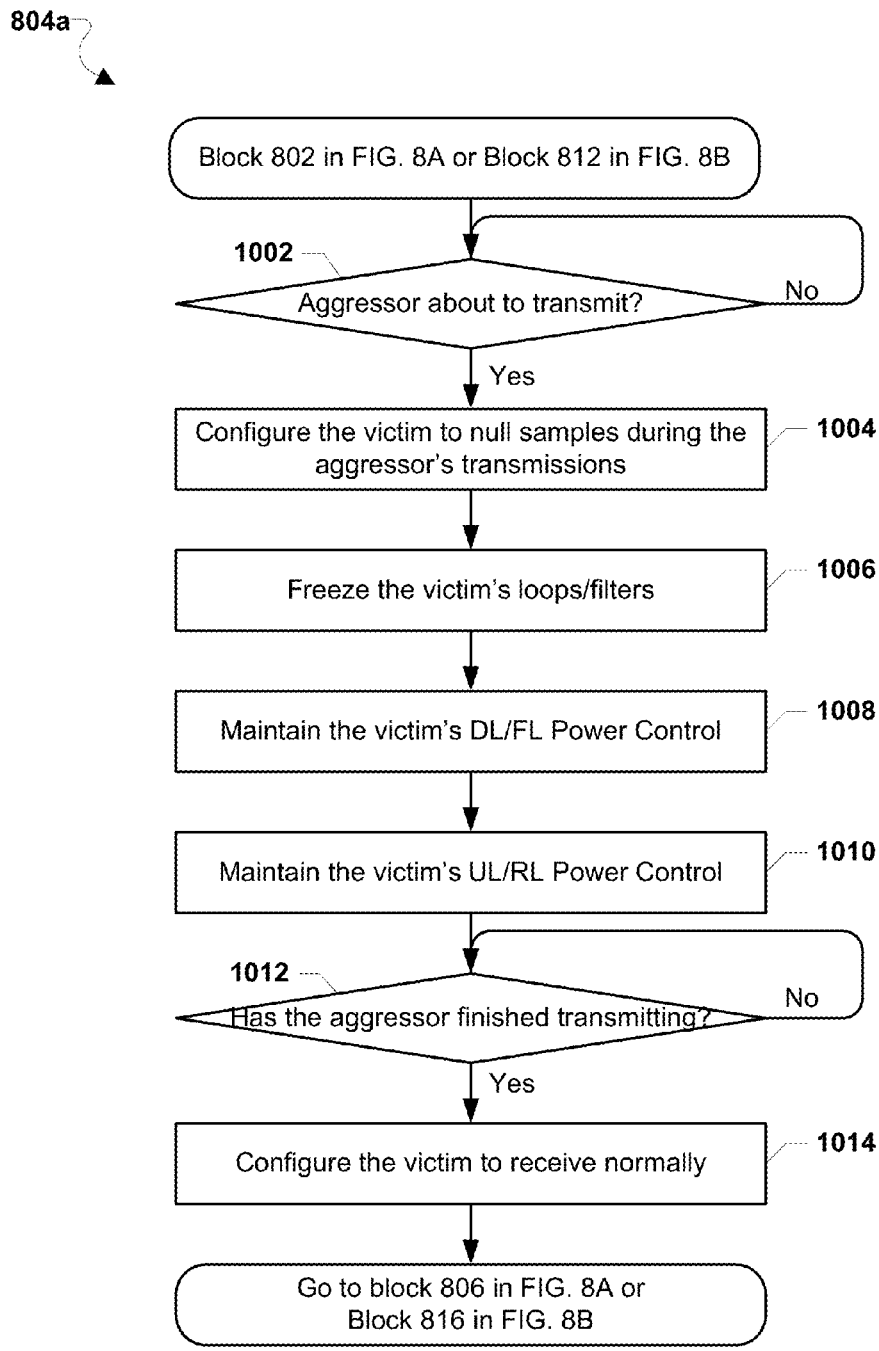
FIG. 10 is a process flow diagram illustrating an embodiment method for configuring a victim to perform Rx blanking.

FIG. 10 illustrates an embodiment method 804a that may be implemented in a MSMA communication device for configuring a victim to perform Rx blanking. The operations of method 804a implement an embodiment of the operations in block 804 of methods 800a, 800b described above with reference to FIGS. 8A and 8B. The MSMA communication device may begin performing method 804a either after configuring the victim to either send a large DOWN or "cease transmitting" command in block 802 of method 416a described above with reference to FIG. 8A, or after configuring the victim to send a "cease transmitting" command in block 812 of method 416b as described above with reference to FIG. 8B. In other words, the MSMA communication device may configure the victim to begin performing Rx blanking after the victim notifies its mobile network that it will not be receiving signals during the aggressor's transmissions.

Since method 804a is implemented after the MSMA communication device has determined the aggressor's transmission schedule (e.g., in block 408 of method 400 described above with reference to FIG. 4), the MSMA communication device may configure the victim to perform various actions depending on when the aggressor is transmitting. This may be accomplished via a programmable timer, a scheduler, or loop algorithm, the latter of which is illustrated in determination block 1002 in which the MSMA communication device may determine whether the aggressor has started or is about to start transmitting. This loop of monitoring the aggressor's transmission status may continue so long as the aggressor is not about to begin transmitting (i.e., determination block 1002="No"). When the MSMA communication device determines that the aggressor has started or is about to start transmitting (i.e., determination block 1002="Yes"), the MSMA communication device may configure the victim to null samples during the aggressor's transmissions in block 1004. In an embodiment, the victim may null samples by zeroing or ignoring the samples it receives during the aggressor's transmission periods.

In block 1006, the MSMA communication device may freeze the victim's loops and/or filters. In an embodiment, such loops and filters may include, for example, a low-noise amplifier, an automatic gain control, a pilot filter, a received signal strength indication, noise power, TTL/FTL, channel estimation, covariance, quasi-linear interference cancellation, and carrier-to-interference estimation. In an embodiment in which the victim is 1×/EV-DO, the loops and filter may include pilot filters, received signal strength indicator filters, covariance filters, channel estimation, and carrier-to-interference ratio estimation. In another embodiment, instead of freezing loops and filters in block 1006, the MSMA communication device may increase the loop bandwidths at the victim's receiver (e.g., DC loop, automatic gain control, etc.).

In block 1008, the MSMA communication device may maintain the victim's downlink/forward link power control. The MSMA communication device may also maintain the victim's uplink/reverse link power control in block 1010.

In determination block 1012, the MSMA communication device may determine whether the aggressor has finished transmitting. This monitoring of the aggressor's transmission state may continue so long as the MSMA communication device determines that the aggressor is transmitting (i.e., determination block 1012="No"), the victim may continue performing Rx blanking during the aggressor's transmissions. When the MSMA communication device determines that the aggressor has finished transmitting (i.e., determination block 1012="Yes"), the MSMA communication device may configure the victim to resume normal operations in block 1014. For example, the MSMA communication device may unfreeze the victim's loops and filters and may configure the victim to discontinue nulling received samples.

In an embodiment in which the victim utilizes closed-loop downlink power control, the MSMA communication device may configure the victim to send a large UP or "resume transmitting" command to the victim's network just after the aggressor finishes transmitting in block 806 of method 416a as described above with reference to FIG. 8A. In an embodiment in which the victim utilizes CQI reporting, the MSMA communication device configure the victim to send a "resume transmitting" command to the victim's network just after the aggressor finished transmitting in block 816 of method 416b as described above with reference to FIG. 8B.

In further embodiments, the MSMA communication device may separately perform the operations of method 804a for each of one or more victims operating on the MSMA communication device that are configured to perform Rx blanking.

Figure 11A:
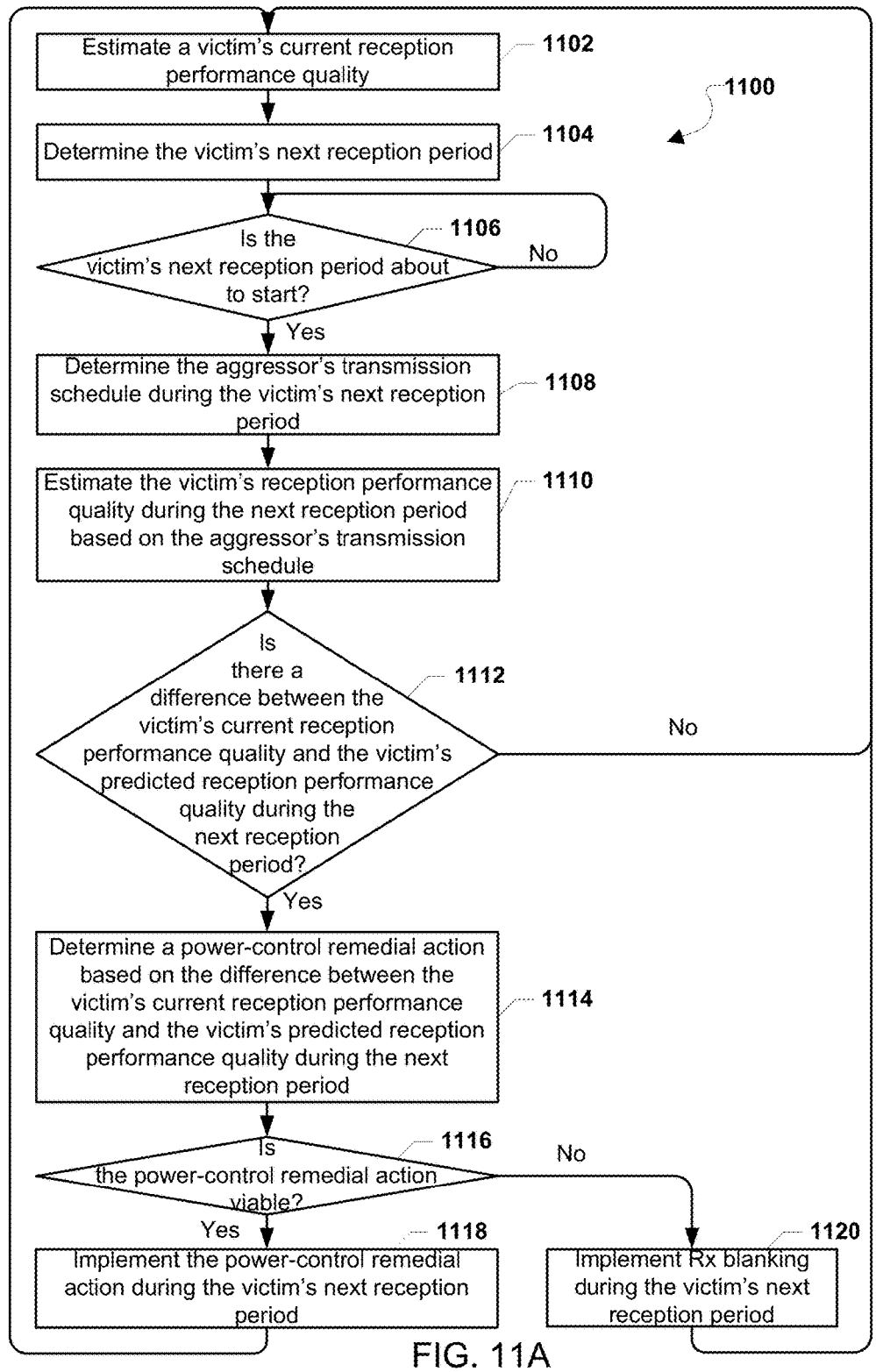
FIG. 11A is a process flow diagram illustrating an embodiment method for implementing an RF coexistence management strategy based on a predicted change in the victim's receiver power during the victim's next reception period.

FIG. 11A illustrates an embodiment method 1100 that may be implemented in a MSMA communication device for implementing a power-control remedial action during a victim's next reception period. In an embodiment, the MSMA communication device may implement a power-control remedial action based on the difference between the victim's current receiver power and the victim's predicted receiver power during a next reception period. The MSMA communication device may perform the operations of method 1100 to ensure that future power-control remedial actions factor in the victim's current condition and anticipate changes to the victim's reception performance quality during the next reception period.

In block 1102, the MSMA communication device may estimate the victim's current reception performance quality. In an embodiment, the MSMA communication device may estimate the victim's signal-to-interference-plus-noise ratio (SINR) or another measure of the victim's signal quality that reflects the effects of interference/de-sense from an aggressor (e.g., $E_b/N_t$). In another embodiment, the MSMA communication device may initially estimate the victim's current reception performance quality and implement a power control change to cause the victim's current SINR to match a target quality (e.g., by requesting the victim's mobile network to increase its downlink power to account for the aggressor's interference).

In block 1104, the MSMA communication device may determine the victim's next reception period. In an embodiment, the MSMA communication device may have received a schedule of the victim's reception periods from the victim's mobile network. In another embodiment, the MSMA communication device may have determined a pattern of the victim's reception periods based on the victim's prior reception operations.

In determination block 1106, the MSMA communication device may determine whether the victim's next reception period is about to start. In an embodiment, the MSMA communication device may attempt to anticipate the victim's next reception period in order to have sufficient time to implement a power-control remedial action when necessary. For example, the MSMA communication device may give itself enough time to determine the power-control remedial action to take during the victim's next reception period and to implement that power-control remedial action just before the victim's next reception period begins. When the MSMA communication device determines that the victim's next reception period is not about to start (i.e., determination block 1106="No"), the MSMA communication device may continuously repeat the process in determination block 1106 to recognize when the victim's next reception period is about to start.

When the MSMA communication device determines that the victim's next reception period is about to start (i.e., determination block 1106="Yes"), the MSMA communication device may determine the aggressor's transmission schedule during the victim's next reception period in block 1108. In an embodiment, the MSMA communication device may determine the aggressor's transmission schedule during the victim's next reception period in a manner similar to determining the aggressor's transmissions schedule during an RF coexistence event in block 408 of method 400 described above with reference to FIG. 4. For example, the MSMA communication device may receive the aggressor's transmission schedule from the aggressor's mobile network and determine whether the aggressor is scheduled to transmit during the victim's next reception period. In another embodiment, the MSMA communication device may use the aggressor's transmission schedule to determine whether the victim will be affected by the aggressor during the next reception period.

In block 1110, the MSMA communication device may estimate the victim's reception performance quality during the next reception period based on the aggressor's transmission schedule. In an embodiment, the MSMA communication device may predict the effects of the aggressor's interference (if any) on the victim's performance during the next reception period. For example, based on the aggressor's transmission schedule, the MSMA communication device may predict that the aggressor will not transmit during the next reception period, which may improve the victim's reception performance quality if the victim is currently being de-sensed. In another example, the MSMA communication device may determine that the victim's performance quality during the next reception period may be degraded because the aggressor may begin transmitting during the next reception period.

In determination block 1112, the MSMA communication device may determine whether there is a difference between the victim's current reception performance quality and the victim's predicted reception performance quality during the next reception period. In an embodiment, the MSMA communication device may calculate the change to the victim's SINR that occurs during the next reception period. For instance, if the MSMA communication device predicts that the aggressor will begin de-sensing the victim during the next reception period, the MSMA communication device may calculate the corresponding decrease in the victim's SINR during the next reception period. In another example, the MSMA communication device may calculate an increase in the victim's SINR or $E_b/N_t$ when the MSMA communication device predicts that the aggressor will stop de-sensing the victim before the next reception period starts.

When the MSMA communication device determines that there is no difference between the victim's current reception performance quality and the victim's predicted reception performance quality during the next reception period (i.e., determination block 1112="No"), the process may continue in a loop as the MSMA communication device may continue by estimating the victim's current reception quality in block 1102. In other words, when the MSMA communication device determines that there will be no change in the victim's reception performance quality during the next reception period (e.g., the aggressor will continue transmitting or will continue not transmitting during this period), the MSMA communication device may not implement a power-control remedial action because the victim's situation will remain the same.

When the MSMA communication device determines that there is a difference (i.e., determination block 1112="Yes"), the MSMA communication device may determine a power-control remedial action based on the difference between the victim's current reception performance quality and the victim's predicted reception performance quality during the next reception period in block 1114.

In an embodiment, the MSMA communication device may implement a power-control remedial action just before the next reception period begins based on whether the difference indicates more or less interference during the next reception period. In another embodiment, the MSMA communication device may implement power-control remedial actions when there is a difference as illustrated in table 1130 described below with reference to FIG. 11B.

FIG. 11B illustrates a table 1130 that describes embodiment power-control remedial actions that the MSMA communication device may implement just before the victim's next reception period begins based on the difference between the victim's current reception performance quality and the victim's predicted reception performance quality during the next reception period. In various embodiments, the MSMA communication device may accomplish this determination by determining whether the victim is currently being de-sensed (i.e., whether the victim's current reception performance quality is affected by the aggressor) and whether the victim is predicted to be de-sensed during the next reception period (i.e., whether the MSMA communication device predicts that victim's reception performance quality during the next reception period will be affected by the aggressor).

In further embodiments, the MSMA communication device may implement the power-control remedial action by configuring the victim to send power control messages to the victim's mobile network just before the next reception period begins. For example, the MSMA communication device may configure the victim to send an UP/DOWN command on the victim's closed-loop downlink power control to increase/decrease the victim's receiver signal strength or a degraded/non-degraded CQI report to increase/decrease the code rate of the received signal just before the next reception period starts.

In an embodiment, when the MSMA communication device determines that the victim is currently being de-sensed and that the victim is predicted to continue being de-sensed during the next reception period, just before the next reception period begins, the MSMA communication device may implement a power-control remedial action based on the estimated difference between the victim's current reception performance quality and the victim's reception performance quality during the next reception period. In other words, the MSMA communication device may determine whether the victim will suffer more or less de-sense during the next reception period than the victim is currently experiencing because of a change in the aggressor's transmitter power. In an embodiment, the MSMA communication device may configure the victim to send a power control command (e.g., an UP/DOWN command or a degraded/non-degraded CQI report) to the victim's mobile network that reflects the estimated difference. In another embodiment (not shown), the MSMA communication device may also configure the victim to operate normally when the predicted difference is not substantial or does not exceed a particular threshold (e.g., the aggressor's transmitter power increases very slightly).

In an embodiment, when the MSMA communication device determines that the victim is currently being de-sensed but will not be de-sensed during the next reception period, the MSMA communication device may similarly implement a power-control remedial action based on the estimated difference between the victim's current reception performance quality and the victim's reception performance quality during the next reception period. However, in this case, the MSMA communication device may configure the victim to send a DOWN power command or a non-degraded CQI report to the victim's network just before the next reception period because the victim is predicted not to be de-sensed during the next reception period. By predicating that the aggressor will stop de-sensing the victim during the next reception period, the MSMA communication device may save network resources by proactively configuring the victim to reduce the victim's reception power during the next reception period.

In an embodiment, when the MSMA communication device determines that the victim is not currently being de-sensed but that the victim will be de-sensed during the next reception period, the MSMA communication device may implement a power-control remedial action based on the estimated difference between the victim's current reception performance quality and the victim's reception performance quality during the next reception period. In this case, the MSMA communication device may anticipate that the victim's reception performance quality will be negatively affected because of the aggressor's transmissions. In an embodiment, the MSMA communication device may implement a power-control remedial action that increases the victim's receiver power during the next reception period to account for this predicted de-sense. For example, just before the next reception period begins, the MSMA communication device may configure the victim to send a power UP command or a degraded CQI report to the victim's network, thereby increasing the victim's reception performance quality during the next reception period to account for the aggressor's interference.

In another embodiment, when the MSMA communication device determines that the victim is not currently being de-sensed and that the victim will not be de-sensed during the next reception period, the MSMA communication device may configure the victim to perform normally or take no additional action during the next reception period. In other words, the MSMA communication may take no action because the victim's reception performance quality is not predicted to change during the next reception period.

Returning to FIG. 11A, in determination block 1116, the MSMA communication device may determine whether the power-control remedial action is viable. In an embodiment, the MSMA communication device may make such a determination based on various criteria, such as the criteria discussed with reference to determination block 412 of method 400 described above with reference to FIG. 4. For example, the MSMA communication device may determine whether the victim's mobile network has the resources to implement a power UP/DOWN command.

If the MSMA communication device determines that the power-control remedial action is viable (i.e., determination block 1116="Yes"), the MSMA communication device may implement the power-control remedial action during the victim's next reception period in block 1118. For example, the MSMA communication device may implement one of the four actions listed in the table shown in FIG. 11B depending on the estimated difference between the victim's current reception performance quality and the victim's predicted reception performance quality during the next reception period.

If the MSMA communication device determines that the power-control remedial action is not viable (i.e., determination block 1116="No"), the MSMA communication device may implement Rx blanking during the victim's next reception period in block 1120. In an embodiment, the MSMA communication device may configure the victim to send a large power DOWN or a "cease transmitting" command to the victim's mobile network just before the next reception period and to send an UP or "resume transmitting" command to the victim's mobile network just after the next reception period ends.

After either implementing the power-control remedial action or implementing Rx blanking during the victim's next reception period, the process may continue in a loop as the MSMA communication device may continue estimating the victim's current reception quality in block 1102.

In an embodiment, the MSMA communication device may include one or more aggressors and one or more victims. When there are one or more aggressors and one or more victims, the MSMA communication device may perform the operations of method 1100 for each victim operating on the MSMA communication device. In such embodiments, it is anticipated that the MSMA communication device may determine the difference between each victim's current reception performance quality and each victim's predicted reception performance quality during the next reception period based on the combined interference from the one or more aggressors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for implementing a radio frequency (RF) coexistence management strategy on a multi-RF communication device for managing effects of an aggressor communication activity ("aggressor") on a victim communication activity ("victim"), comprising:
   determining when an RF coexistence event will next start, wherein:
   the RF coexistence event comprises a period in which uplink transmissions on a first RF resource of the communication device overlap in time with downlink reception on a second RF resource of the communication device, and the aggressor is supported by a first wireless communication network associated with the first RF resource and the victim is supported by a second wireless communication network associated with the second RF resource;

determining whether a power-control remedial action is viable; and implementing the power-control remedial action when the RF coexistence event will next start in response to determining that the power-control remedial action is viable, wherein implementing the power-control remedial action comprises:

configuring the victim to send a degraded channel quality indicator (CQI) report to the second wireless communication network just before a transmission by the aggressor is about to start;

waiting for the aggressor to finish the transmission; and configuring the victim to send a non-degraded CQI report to the second wireless communication network just after the transmission by the aggressor finishes.

2. The method of claim 1, further comprising determining estimated effects of a plurality of aggressors' combined interference on the victim's performance quality.

3. The method of claim 1, further comprising:

determining whether the RF coexistence event has ended; and returning the victim to normal operations in response to determining that the RF coexistence event has ended.

4. The method of claim 1, further comprising determining estimated effects of the aggressor's interference on the victim's performance quality by:

determining a target performance quality of the victim;
estimating an interference power of the aggressor;
estimating a degraded performance quality of the victim based on the estimated interference power of the aggressor;
calculating a difference in performance quality between the target performance quality and the degraded performance quality; and
determining a required increase in signal power of the victim's network to compensate for the difference in performance quality.

5. The method of claim 4, wherein determining whether the power-control remedial action is viable comprises at least one of:

determining whether the required increase in signal power from the victim's network exceeds a power increase threshold;
determining whether a downlink channel power of the victim's network is too close to a ceiling to implement the required increase in signal power; and
determining whether the victim's network is too close to being power-limited on a downlink to implement the required increase in signal power.

6. The method of claim 4, wherein determining whether the power-control remedial action is viable comprises:

determining that the power-control remedial action is not viable when the required increase in signal power from the victim's network exceeds a power increase threshold, a downlink channel power of the victim's network is too close to a ceiling to implement the required increase in signal power, and the victim's network is too close to being power-limited on a downlink to implement the required increase in signal power; and determining that the power-control remedial action is viable when the required increase in signal power from the victim's network does not exceed the power increase threshold, or the downlink channel power of the victim's network is not too close to the ceiling to implement the required increase in signal power, or the victim's network is not too close to being power-limited on the downlink to implement the required increase in signal power.

7. A method for implementing a radio frequency (RF) coexistence management strategy on a multi-RF communication device for managing effects of an aggressor communication activity ("aggressor") on a victim communication activity ("victim"), comprising:

determining when an RF coexistence event will next start, wherein:

the RF coexistence event comprises a period in which uplink transmissions on a first RF resource of the communication device overlap in time with downlink reception on a second RF resource of the communication device, and the aggressor is supported by a first wireless communication network associated with the first RF resource and the victim is supported by a second wireless communication network associated with the second RF resource:

determining whether a power-control remedial action is viable; and implementing the power-control remedial action when the RF coexistence event will next start in response to determining that the power-control remedial action is viable, wherein implementing the power-control remedial action comprises:

configuring the victim to send a power UP command on the victim's closed-loop downlink power control just before a transmission by the aggressor is about to start;

waiting for the aggressor to finish the transmission; and configuring the victim to send a power DOWN command on the victim's closed-loop downlink power control just after the transmission by the aggressor finishes.

8. The method of claim 7, wherein at least one of the power UP command and the power DOWN command may be a request for a power change of an arbitrary size.

9. The method of claim 2, wherein implementing receive blanking on the victim further comprises:

configuring the victim to send one of a power DOWN command or a "cease transmitting" command to the victim's mobile network just before the transmission by the aggressor is about to start;

configuring the victim to pause receive operations during the transmission by the aggressor; and configuring the victim to send one of a large power UP command or a "resume transmitting" command to the victim's mobile network just after the transmission by the aggressor.

10. The method of claim 9, wherein at least one of the large power UP command and the large power DOWN command may be a request for a power change of an arbitrary size.

11. The method of claim 9, wherein configuring the victim to pause receive operations during the transmission by the aggressor comprises:

configuring the victim to null samples;

freezing loops and filters of the victim;
maintaining downlink and forward link power control for the victim; and
maintaining uplink and reverse link power control for the victim.

12. The method of claim 11, further comprising:
determining whether the transmission by the aggressor has finished; and
configuring the victim to receive normally in response to determining that the transmission by the aggressor has finished.

13. A multi-radio frequency (RF) communication device, comprising:
a memory;
at least a first RF resource and a second RF resource; and
a processor coupled to the memory, the first RF resource, and the second RF resource, wherein the processor is configured with processor-executable instructions to:
determine when an RF coexistence event between a victim communication activity ("victim") and an aggressor communication activity ("aggressor") will next start, wherein:
the RF coexistence event comprises a period in which uplink transmissions on the first RF resource overlap in time with downlink reception on the second RF resource, and
the aggressor is supported by a first wireless communication network associated with the first RF resource and the victim is supported by a second wireless communication network associated with the second RF resource;
determine whether a power-control remedial action is viable; and
implement the power-control remedial action when the RF coexistence event will next start in response to determining that the power-control remedial action is viable, wherein the processor is further configured with processor-executable instructions to implement the power-controlled remedial action by:
configured the victim to send a degraded channel quality indicator (CQI) report to the second wireless communication network just before a transmission by the aggressor is about to start;
waiting for the aggressor to finish the transmission; and
configuring the victim to send a non-degraded CQI report to the second wireless communication network just after the transmission by the aggressor finishes.

14. The multi-RF communication device of claim 13, wherein the processor is configured with processor-executable instructions to determine estimated effects of a plurality of aggressors' combined interference on the victim's performance quality.

15. The multi-RF communication device of claim 13, wherein the processor is further configured with processor-executable instructions to:
determine whether the RF coexistence event has ended; and
return the victim to normal operations in response to determining that the RF coexistence event has ended.

16. The multi-RF communication device of claim 13, wherein the processor is further configured with processor-executable instructions to determine estimated effects of the aggressor's interference on the victim's performance quality by:
determining a target performance quality of the victim;
estimating an interference power of the aggressor;
estimating a degraded performance quality of the victim based on the estimated interference power of the aggressor;
calculating a difference in performance quality between the target performance quality and the degraded performance quality; and
determining a required increase in signal power of the victim's network to compensate for the difference in performance quality.

17. The multi-RF communication device of claim 16, wherein the processor is further configured with processor-executable instructions to determine whether the power-control remedial action is viable by at least one of:
determining whether the required increase in signal power from the victim's network exceeds a power increase threshold;
determining whether a downlink channel power of the victim's network is too close to a ceiling to implement the required increase in signal power; and
determining whether the victim's network is too close to being power-limited on a downlink to implement the required increase in signal power.

18. The multi-RF communication device of claim 17, wherein the processor is further configured with processor-executable instructions to determine whether the power-control remedial action is viable by:
determining that the power-control remedial action is not viable when the required increase in signal power from the victim's network exceeds a power increase threshold, a downlink channel power of the victim's network is too close to a ceiling to implement the required increase in signal power, and the victim's network is too close to being power-limited on a downlink to implement the required increase in signal power; and
determining that the power-control remedial action is viable when the required increase in signal power from the victim's network does not exceed the power increase threshold, or the downlink channel power of the victim's network is not too close to the ceiling to implement the required increase in signal power, or the victim's network is not too close to being power-limited on the downlink to implement the required increase in signal power.

19. A multi-radio frequency (RF) communication device, comprising:
a memory;
at least a first RF resource and a second RF resource; and
a processor coupled to the memory, the first RF resource, and the second RF resource, wherein the processor is configured with processor-executable instructions to:
determine when an RF coexistence event between a victim communication activity ("victim") and an aggressor communication activity ("aggressor") will next start, wherein:
the RF coexistence event comprises a period in which uplink transmissions on the first RF resource overlap in time with downlink reception on the second RF resource; and
the aggressor is supported by a first wireless communication network associated with the first RF resource and the victim is supported by a second wireless communication network associated with the second RF resource; determine whether a power-control remedial action is viable; and
implement the power-control remedial action when the RF coexistence event will next start in response to determining that the power-control remedial action is viable, wherein the processor is further configured with processor-executable instructions to implement the power-control remedial action by:
  configuring the victim to send a power UP command on the victim's closed-loop downlink power control just before a transmission by the aggressor is about to start;
  waiting for the aggressor to finish the transmission; and
  configuring the victim to send a power DOWN command on the victim's closed-loop downlink power control just after the transmission by the aggressor finishes.

20. The multi-RF communication device of claim 19, wherein at least one of the power UP command and the power DOWN command may be a request for a power change of an arbitrary size.

21. The multi-RF communication device of claim 2, wherein the processor is further configured with processor-executable instructions to implement receive blanking on the victim by:
  configuring the victim to send one of a power DOWN command or a "cease transmitting" command to the victim's mobile network just before the transmission by the aggressor is about to start;
  configuring the victim to perform pause receive operations during the transmission by the aggressor; and
  configuring the victim to send one of a large power UP command or a "resume transmitting" command to the victim's mobile network just after the transmission by the aggressor finishes.

22. The multi-RF communication device of claim 21, wherein at least one of the large power UP command and the large power DOWN command may be a request for a power change of an arbitrary size.

23. The multi-RF communication device of claim 21, wherein the processor is further configured with processor-executable instructions to configure the victim to pause receive operations during the transmission by the aggressor by:
  configuring the victim to null samples;
  freezing loops and filters of the victim;
  maintaining downlink and forward link power control for the victim; and
  maintaining uplink and reverse link power control for the victim.

24. The multi-RF communication device of claim 23, wherein the processor is configured with processor-executable instructions to:
  determine whether the transmission by the aggressor has finished; and
  configure the victim to receive normally in response to determining that the transmission by the aggressor has finished.

25. A multi-radio frequency (RF) communication device, comprising:
  means for determining when an RF coexistence event will next start between an aggressor communication activity ("aggressor") and a victim communication activity ("victim"), wherein:
    the RF coexistence event comprises a period in which uplink transmissions on a first RF resource of the communication device overlap in time with downlink reception on a second RF resource of the communication device, and
    the aggressor is supported by a first wireless communication network associated with the first RF resource and the victim is supported by a second wireless communication network associated with the second RF resource;
  means for determining whether a power-control remedial action is viable; and
  means for implementing the power-control remedial action when the RF coexistence event will next start in response to determining that the power-control remedial action is viable, wherein the means for implementing the power-control remedial action comprises:
    means for configuring the victim to send a degraded channel quality indicator (CQI) report to the second wireless communication network just before a transmission by the aggressor is about to start;
    means for waiting for the aggressor to finish the transmission; and
    means for configuring the victim to send a non-degraded CQI report to the second wireless communication network just after the transmission by the aggressor finishes.

26. A non-transitory processor-readable storage medium having stored thereon processor-executable software instructions configured to cause a processor of a multi-radio frequency (RF) communication device to perform operations comprising:
  determining when a RF coexistence event will next start between an aggressor communication activity ("aggressor") and a victim communication activity ("victim"), wherein:
    the RF coexistence event comprises a period in which uplink transmissions on a first RF resource of the communication device overlap in time with downlink reception on a second RF resource of the communication device, and
    the aggressor is supported by a first wireless communication network associated with the first RF resource and the victim is supported by a second wireless communication network associated with the second RF resource;
  determining whether a power-control remedial action is viable; and
  implementing the power-control remedial action when the RF coexistence event will next start in response to determining that the power-control remedial action is viable, wherein implementing the power-control remedial action comprises:
    configuring the victim to send a degraded channel quality indicator (CQI) report to the second wireless communication network just before a transmission by the aggressor is about to start;
    waiting for the aggressor to finish the transmission; and
    configuring the victim to send a non-degraded CQI report to the second wireless communication network just after the transmission by the aggressor finishes.

27. The method of claim 1, further comprising:
  implementing receive blanking on the victim when the RF coexistence event will next start in response to determining that the power-control remedial action is not viable, wherein the receive blanking comprises pausing the victim's receive operations during transmission by the aggressor.

28. The multi-RF communication device of claim 13, wherein the processor is further configured with processor-executable instructions to:
  implement receive blanking on the victim when the RF coexistence event will next start in response to determining that the power-control remedial action is not viable, wherein the receive blanking comprises pausing the victim's receive operations during transmission by the aggressor.

\* \* \* \* \*